Sept. 20, 1949. G. RATTRAY ET AL 2,482,596
CAMERA HAVING DETACHABLE MAGAZINE
Filed Dec. 28, 1943 11 Sheets-Sheet 1
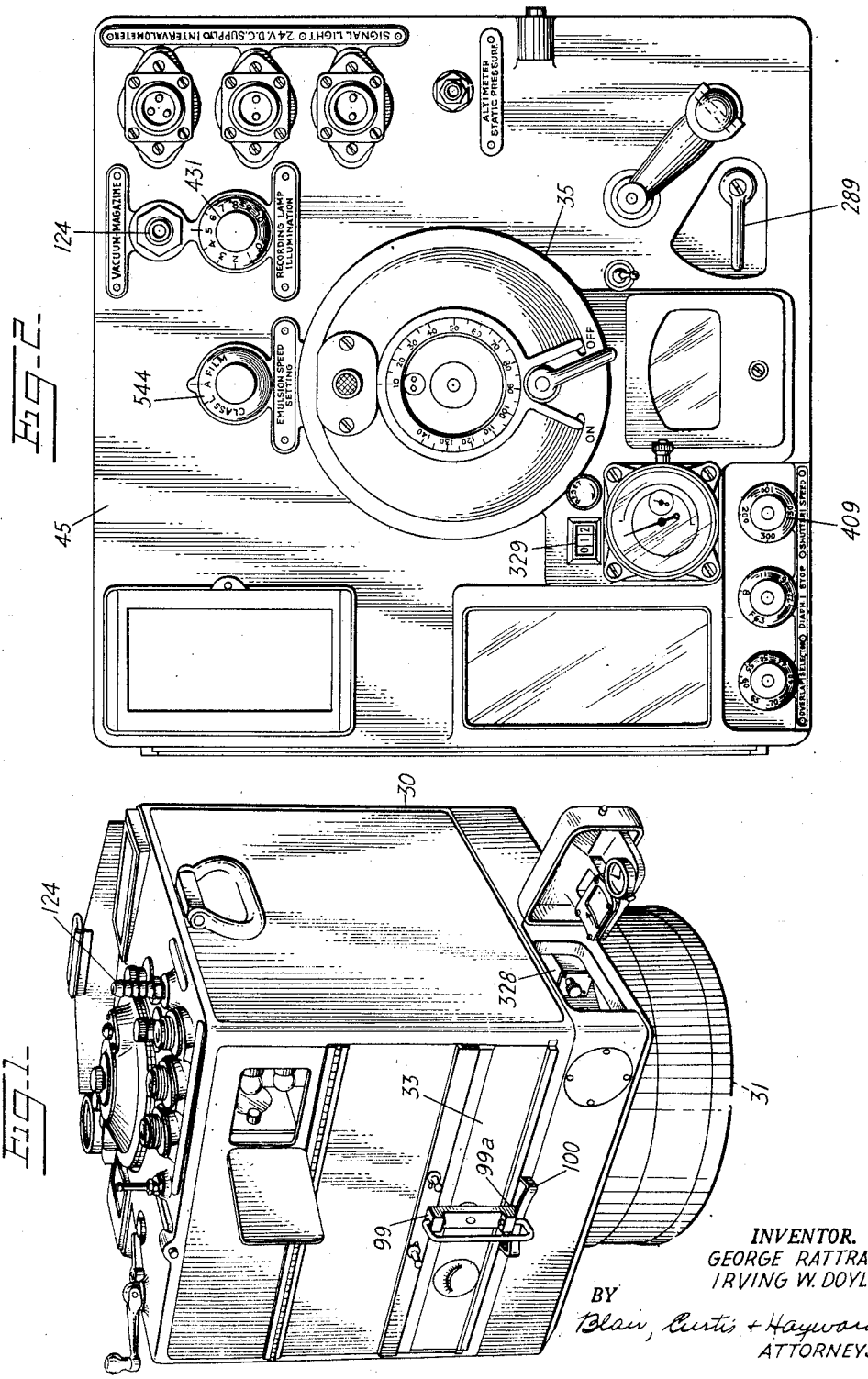
INVENTOR.
GEORGE RATTRAY
IRVING W. DOYLE
BY Blair, Curtis + Hayward
ATTORNEYS Sept. 20, 1949.                G. RATTRAY ET AL                2,482,596
                    CAMERA HAVING DETACHABLE MAGAZINE
Filed Dec. 28, 1943                                    11 Sheets-Sheet 2
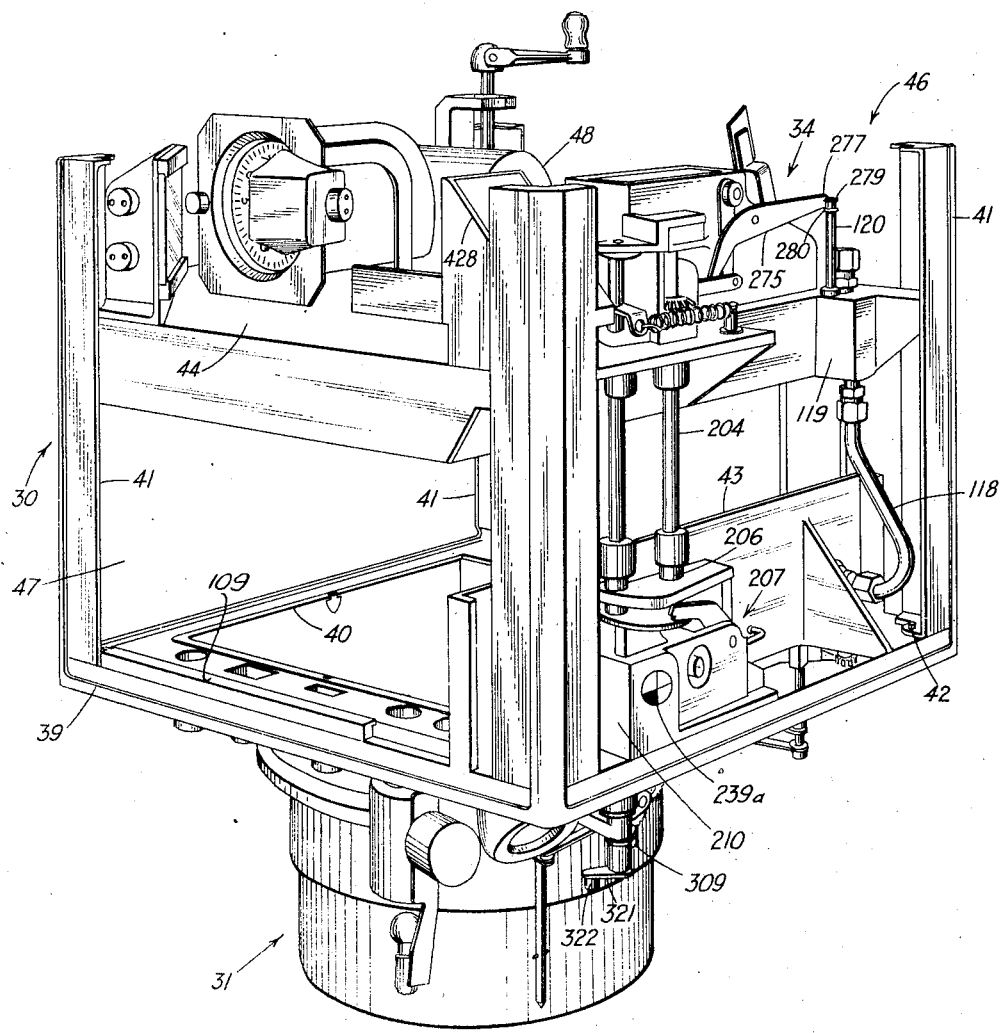
INVENTORS
GEORGE RATTRAY
IRVING W DOYLE
BY
ATTORNEYS Sept. 20, 1949.                G. RATTRAY ET AL                2,482,596
                        CAMERA HAVING DETACHABLE MAGAZINE
Filed Dec. 28, 1943                                    11 Sheets-Sheet 3
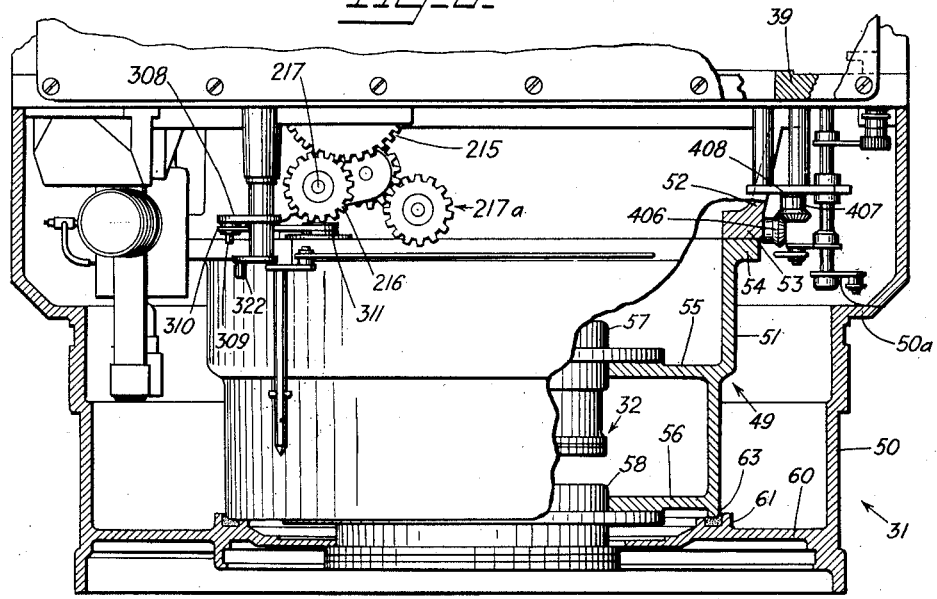
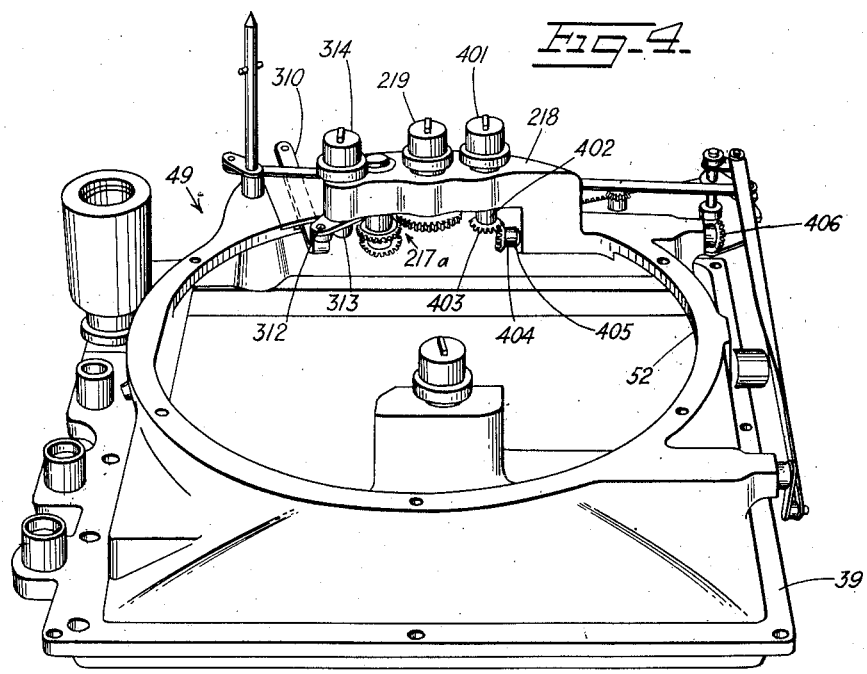
INVENTORS
GEORGE RATTRAY
IRVING W. DOYLE
BY Blair, Curtis + Hayward
ATTORNEYS

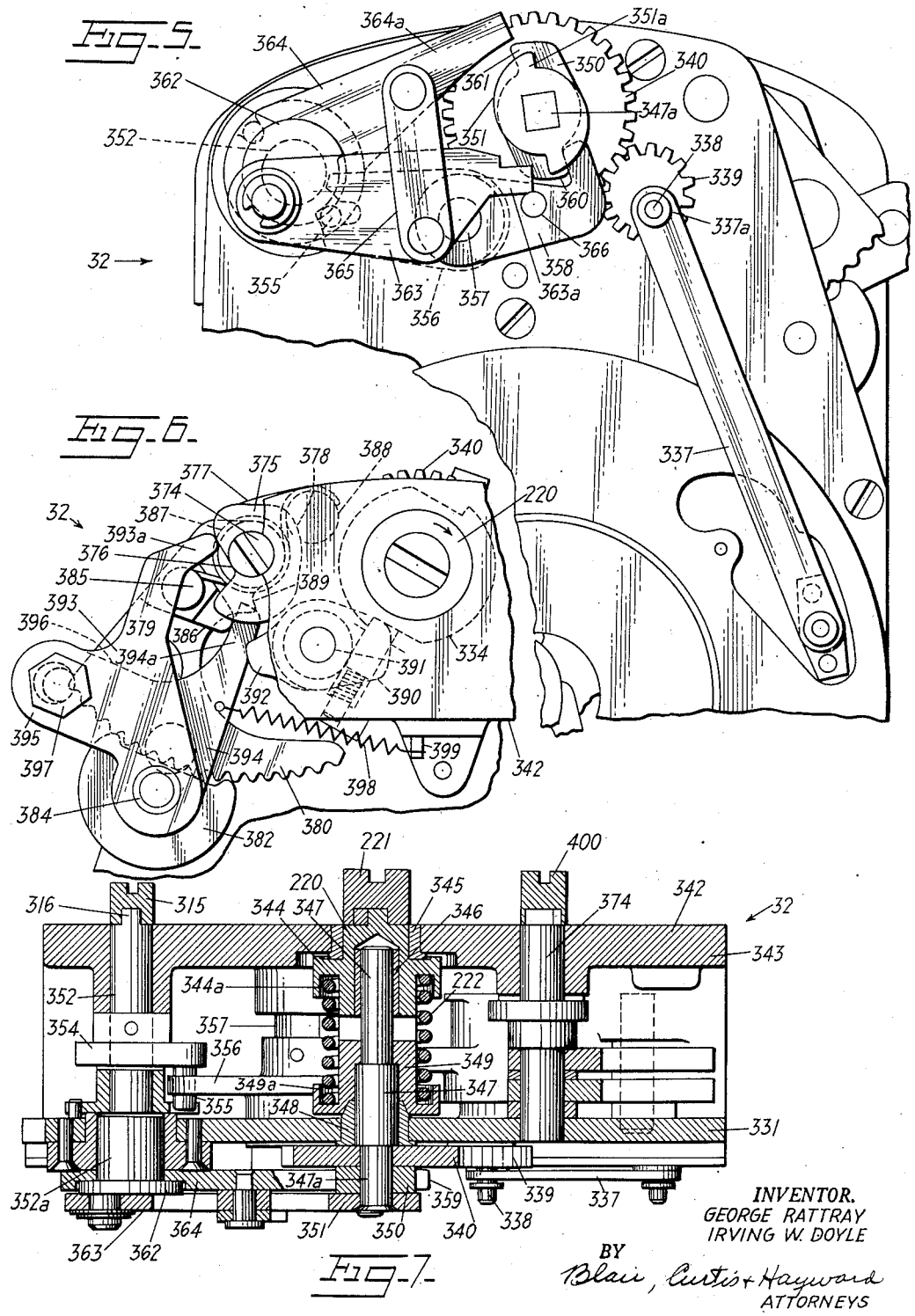

Sept. 20, 1949.  G. RATTRAY ET AL  2,482,596
CAMERA HAVING DETACHABLE MAGAZINE
Filed Dec. 28, 1943  11 Sheets-Sheet 5
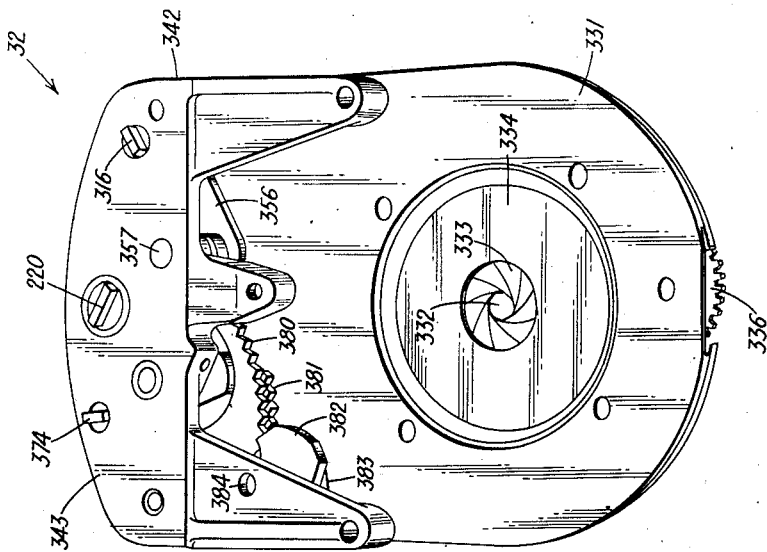
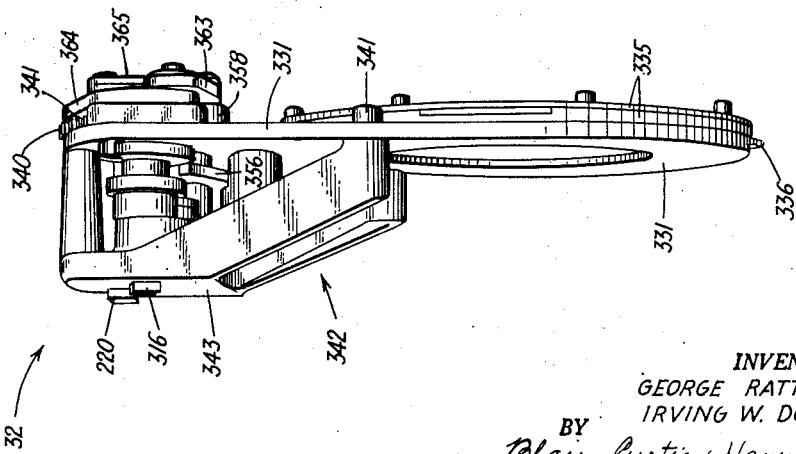
INVENTORS
GEORGE RATTRAY
IRVING W. DOYLE
BY
Blair, Curtis + Hayward
ATTORNEYS

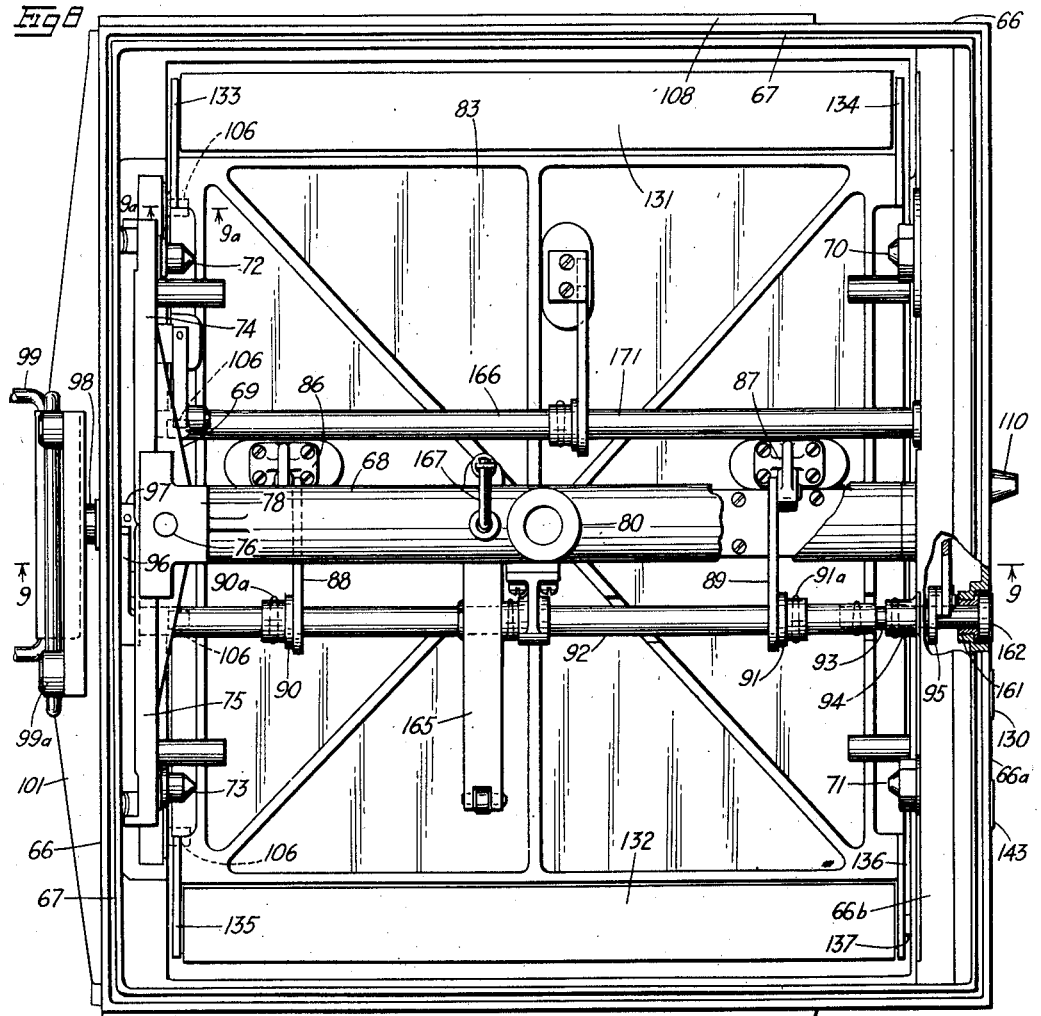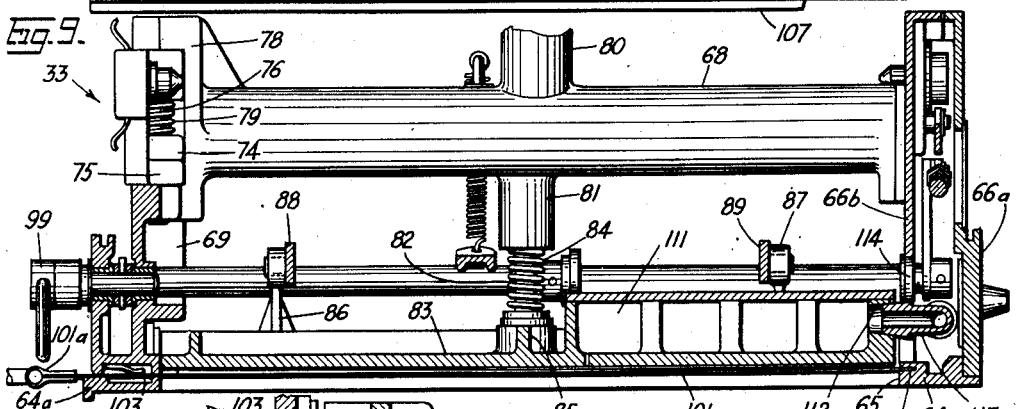

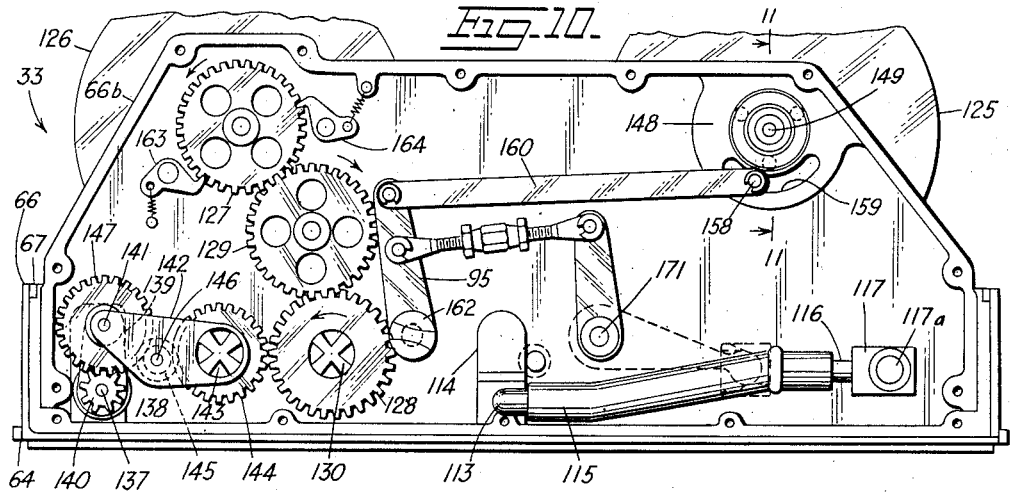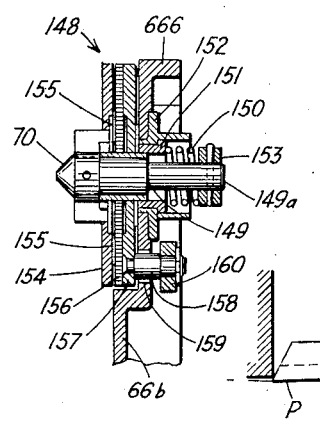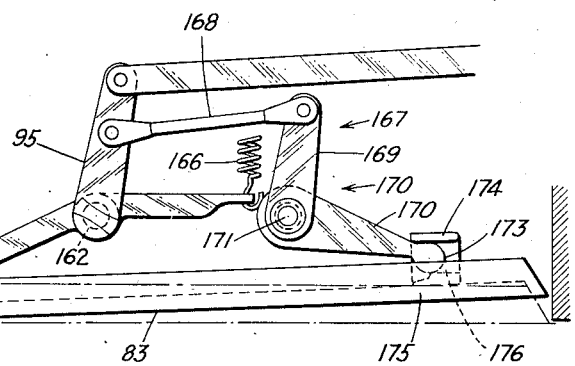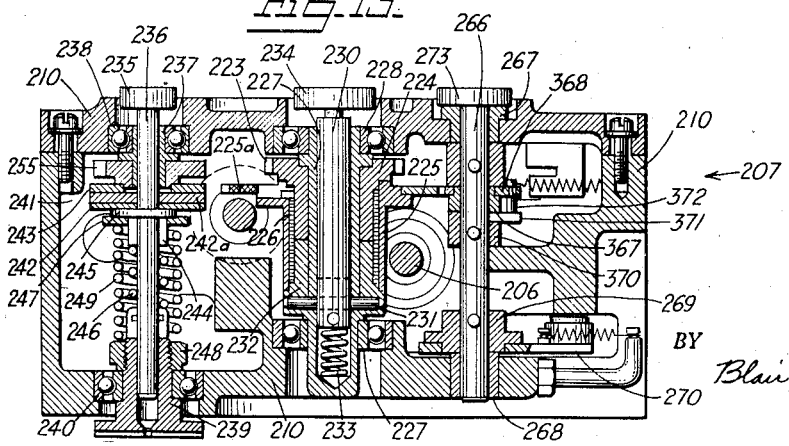

Sept. 20, 1949.   G. RATTRAY ET AL   2,482,596
CAMERA HAVING DETACHABLE MAGAZINE
Filed Dec. 28, 1943   11 Sheets-Sheet 8
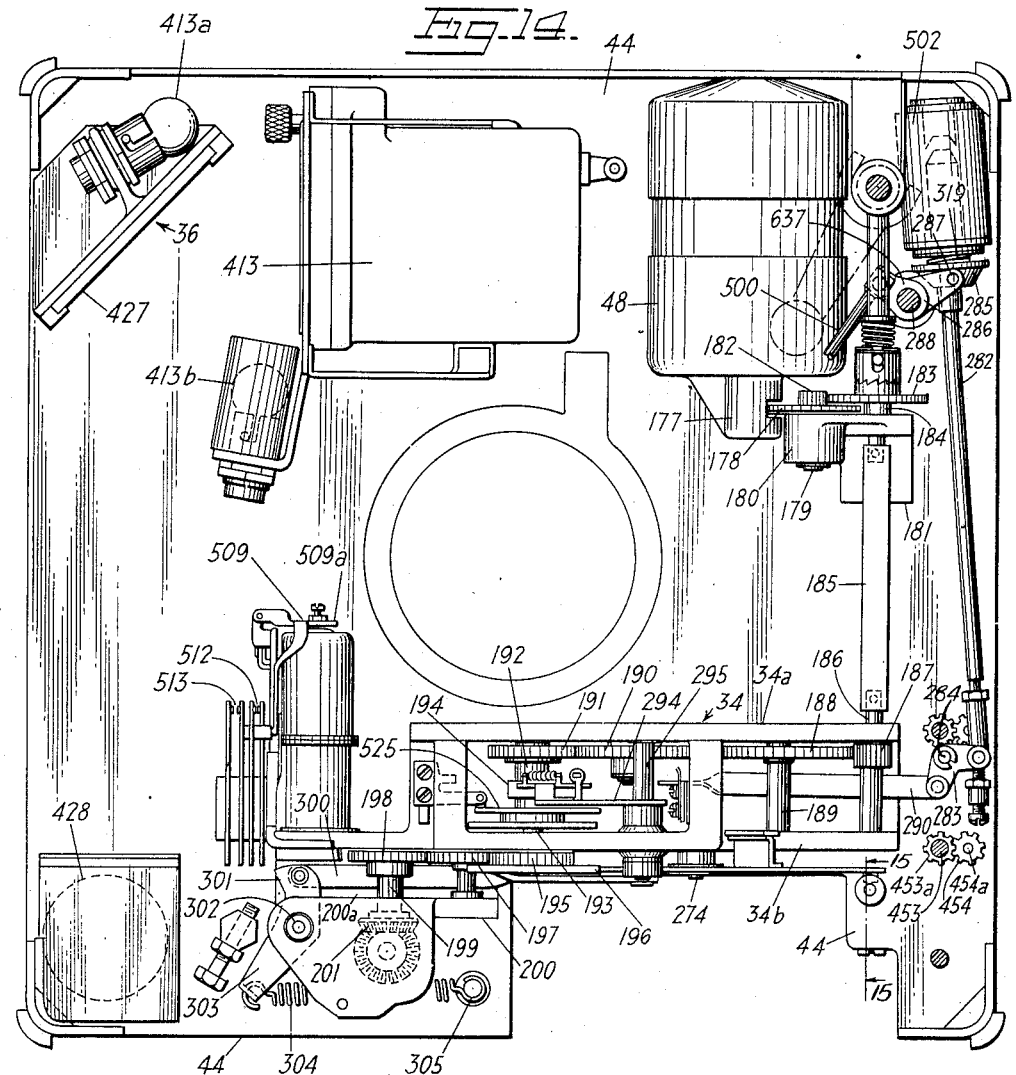
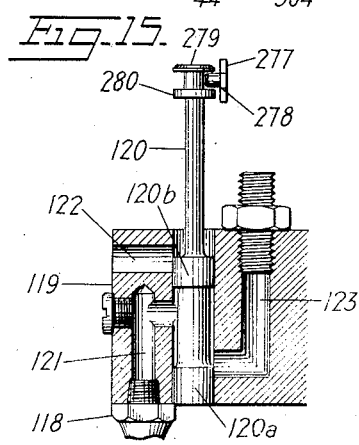
INVENTOR.
GEORGE RATTRAY
IRVING W. DOYLE
BY
Blair, Curtis & Hayward
ATTORNEYS

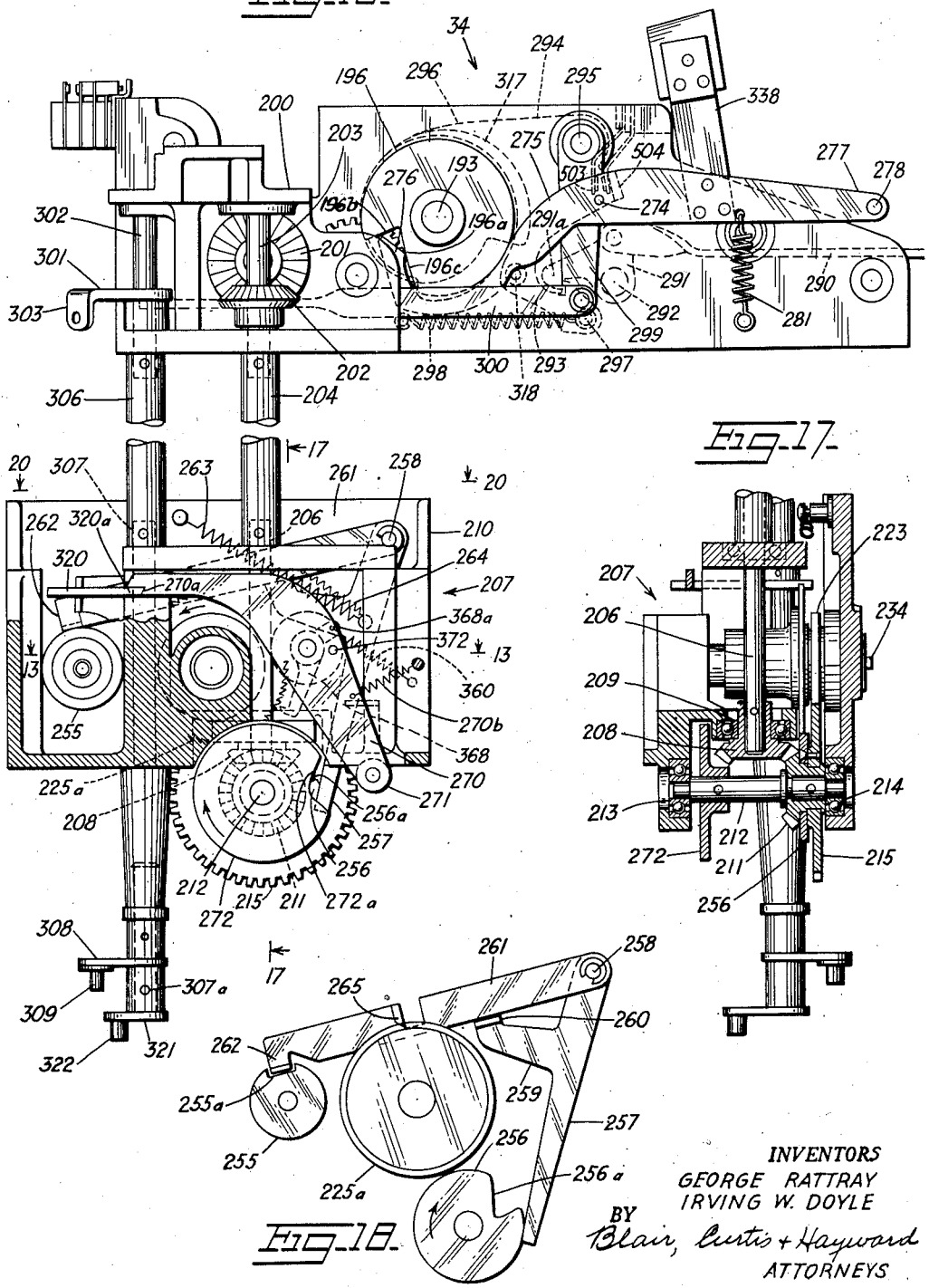

Sept. 20, 1949.  G. RATTRAY ET AL  2,482,596
CAMERA HAVING DETACHABLE MAGAZINE
Filed Dec. 28, 1943  11 Sheets-Sheet 10
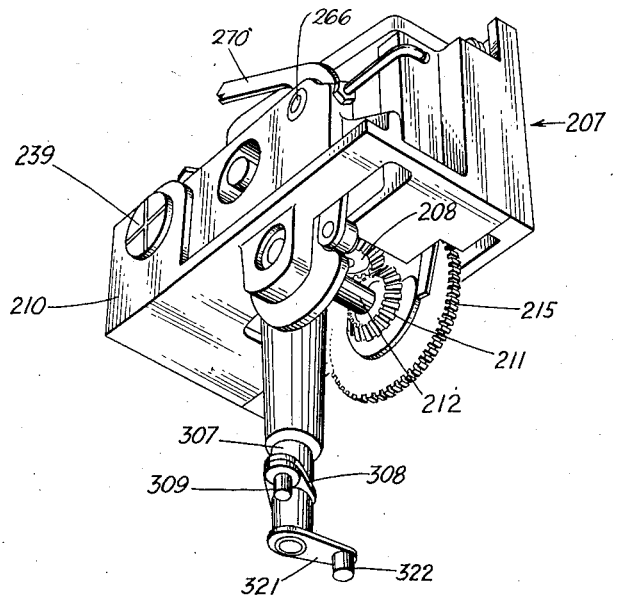
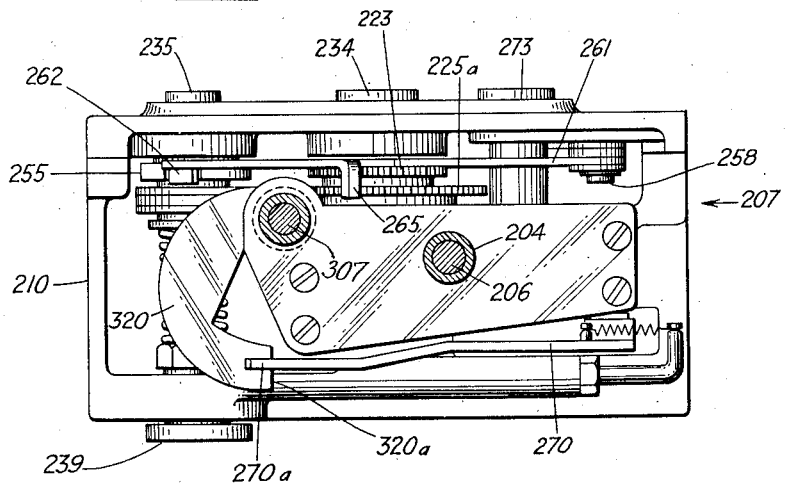
INVENTORS
GEORGE RATTRAY
IRVING W. DOYLE
BY
Blair, Curtis + Hayward
ATTORNEYS Sept. 20, 1949.　　　G. RATTRAY ET AL　　　2,482,596
CAMERA HAVING DETACHABLE MAGAZINE
Filed Dec. 28, 1943　　　　　　　　　　　11 Sheets-Sheet 11

INVENTORS
GEORGE RATTRAY
IRVING W. DOYLE
BY
Blair, Curtis + Hayward
ATTORNEYS

Patented Sept. 20, 1949

2,482,596

UNITED STATES PATENT OFFICE 2,482,596

CAMERA HAVING DETACHABLE MAGAZINE

George Rattray, Mineola, and Irving W. Doyle, Massapequa, N. Y., assignors to Fairchild Camera and Instrument Corporation, a corporation of Delaware Application December 28, 1943, Serial No. 515,968

21 Claims. (Cl. 95—31)

This invention relates to photographic apparatus and more particularly to a camera for use in aerial photography.

Modern aerial photography requirements, both military and commercial, are such that in order to be met a high degree of precision is necessary in the photographic equipment used. Very often circumstances are such that the aircraft in which the camera is mounted must fly at substantial altitude, making it difficult to obtain sharp and accurate photographs of the terrain over which the aircraft is flying. Furthermore, it is important, particularly where the photographs are to be used for mapping purposes, that each photograph include various important data concerning such factors as the time of day, the altitude, the number of the particular photograph where a series thereof are being taken, the attitude of the camera at the time of exposure, i. e., whether or not the focal plane was horizontal, and such other data as may be required. In order to attain such high precision and include in each photograph the data referred to, and at the same time relieve the aircraft pilot or such person responsible for operating the camera of making numerous adjustments and settings preliminary to making one or more exposures, such a camera should be to as great an extent as possible automatic, thus not only relieving the operator of making such settings, but also precluding the possibility of various errors resulting from the human element.

It is accordingly among the objects of this invention to provide an aerial camera which is sturdy and durable under conditions of rigorous use, which is capable of efficient and dependable operation over an extended period of time, which does not require in its operation any great degree of skill, but which nevertheless is capable of precisely photographing any desired terrain.

The invention accordingly consists in the features of construction, combinations of elements, and arrangements of parts as will be exemplified in the structure to be hereinafter described, and the scope of the application of which will be indicated in the following claims.

In the drawing, in which we have shown one form of our invention,

Figure 1 is a perspective view of the camera;

Figure 2 is an enlarged top plan view;

Figure 2A is an enlarged perspective view of the camera with various cover plates removed therefrom to disclose interior mechanism;

Figure 3 is an enlarged fragmentary sectional elevation with portions broken away to show various features of the cone construction and portions of the shutter operating mechanism;

Figure 4 is an inverted perspective view of a portion of the cone structure showing other details of the shutter operating mechanism, as well as portions of the recording system;

Figure 5 is an enlarged fragmentary top plan view of a portion of the shutter mechanism;

Figure 6 is an enlarged fragmentary bottom plan view of a portion of the shutter mechanism showing the retard device for obtaining various shutter speeds;

Figure 7 is an enlarged sectional elevation of the shutter operating mechanism;

Figure 7A is a reduced perspective view of one side of the shutter assembly;

Figure 7B is a reduced perspective view of the top of the shutter assembly;

Figure 8 is an enlarged top plan view of the film magazine;

Figure 9 is a sectional elevation taken along the line 9—9 of Figure 8;

Figure 9A is an enlarged sectional detail of the lower left-hand portion of Figure 9 taken along the line 9—9 of Figure 8;

Figure 10 is a side elevation showing various details of a portion of the drive mechanism for the magazine;

Figure 11 is an enlarged section taken along the line 11—11 of Figure 10;

Figure 12 is an enlarged schematic view to illustrate the action of the pressure plate in the film magazine;

Figure 13 is a horizontal section taken along the line 13—13 of Figure 16, showing various details of other portions of the driving mechanism for the film magazine;

Figure 14 is a top plan view of the skeletonized structure shown in Figure 2A;

Figure 15 is an enlarged section taken along the line 15—15 of Figure 14;

Figure 16 is an enlarged fragmentary sectional elevation of the right-hand face of the skeletonized view shown in Figure 2A;

Figure 17 is a section taken along the line 17—17 of Figure 16;

Figure 18 is a diagrammatic view of certain of the cams and followers shown in the lower left-hand portion of Figure 16;

Figure 19 is a perspective view of the lower left-hand portion of Figure 16, showing the magazine driving mechanism as an entire assembly, and also showing the driving connection to the shutter operating mechanism;

Figure 20 is a top plan view of the mechanism shown in Figure 19; and,

Similar reference characters refer to similar parts throughout the various views of the drawing.

Figure 21:
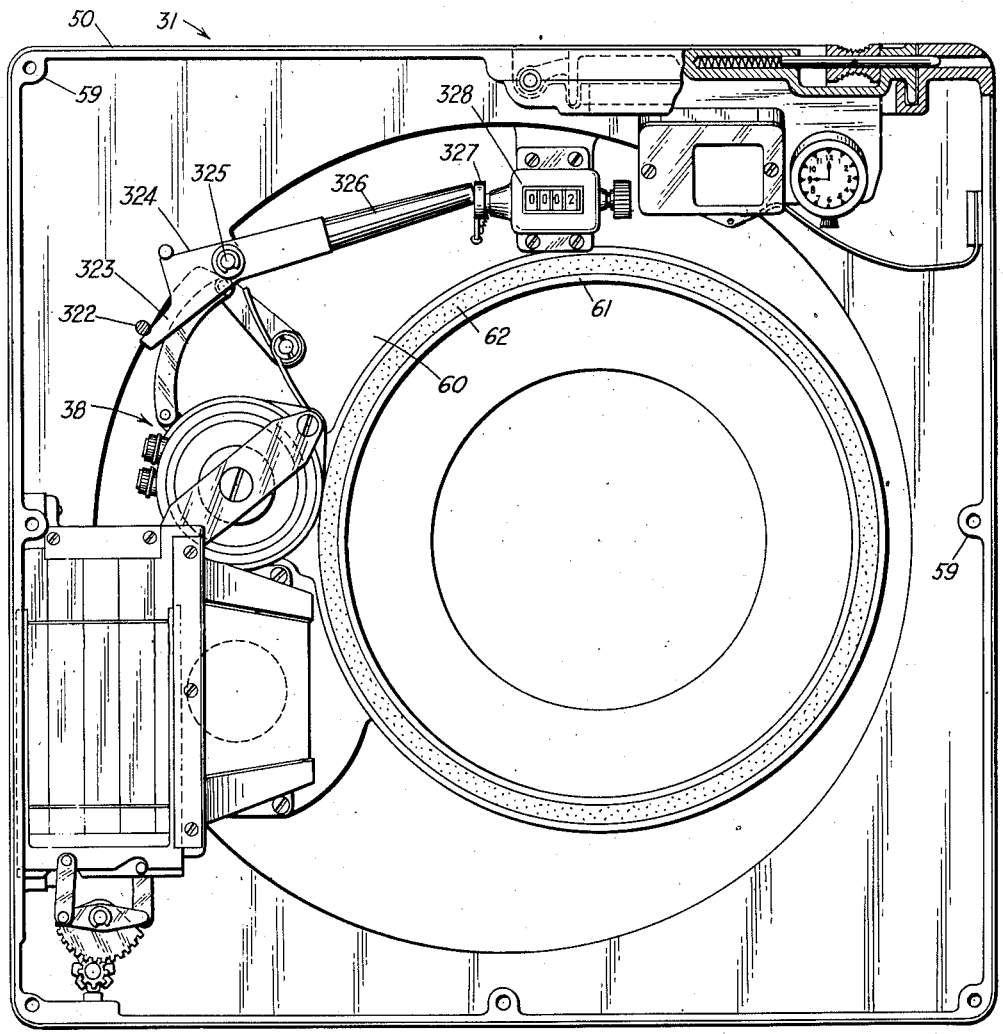
Figure 21 is a top plan view of the outer cone assembly showing the view finder and various of the data indicating devices.

In general, the camera consists of a number of unitary assemblies constituting integral units. These units are generally indicated in various figures of the drawing as follows:

30—frame or case (Figures 1 and 2A)
31—cone (Figures 1, 2A, 3 and 21)
32—shutter (Figures 5, 6 and 7)
33—magazine (Figures 1, 8, 9 and 10)
34—case drive (Figures 2A, 14 and 16)
35—intervalometer (Figures 2, 23–27)
36—recording system (Figures 1, 2A, 4, 14 and 21)
37—picture alignment and overlap (Figures 2, 21 and 22)
38—exposure meter system (Figures 2 and 21)
800—mount As best shown in Figure 2A, the camera frame 30 is constituted by a base plate or frame 39 which forms a supporting plate for the cone 31, defines the aperture 40 which lies in the focal plane of the camera, and carries four posts 41 which are secured to plate 39 as by screws 42. Plate 39 also has attached thereto a vertical partition or supporting plate 43, while a horizontal partition or table 44 is secured at its four corners to posts 41. On the tops of posts 41 is secured the top plate 45 (Figure 2) of the camera, thus dividing that portion of the camera which lies above its focal plane into compartments 46 and 47, respectively (see Figure 2A).

Upper compartment 46 houses the case drive 34, together with a driving motor 48, both of which are secured to table 44 while lower compartment 47 provides a chamber for the film magazine 33 (Figure 1) which may be slid into compartment 47 or removed therefrom through the left rear face, as shown in Figure 2A. As noted above, base plate 39 constitutes a part of cone assembly 31 which will now be described.

CONE

As best shown in Figure 3, cone 31 comprises inner and outer members or cones generally indicated at 49 and 50, respectively. Inner cone 49 comprises base plate 39 and a lower annular member 51. Base plate 39 includes a downwardly extending integral portion 52 having a flange 53 secured to a flange 54 on the upper portion of member 51, inner member 51 also including an upper inner ring-like flange 55 and a lower inner ring-like flange 56 which provide mounts for lens elements 57 and 58. As noted hereinabove, the top of plate 39 defines the focal plane of the camera, i. e., a central point in the plane of the top of this plate is the locus of the focal length of the lens comprising the elements 57 and 58. Thus it may be seen that by accurately machining the engaging faces of flanges 53 and 54, the locus of the focal plane can be determined with great accuracy with the result that lens elements 57 and 58 may be replaced as necessary by elements of the same focal length, without the necessity of any further adjustments to locate properly the focal plane.

The outer member or cone 50 (see also Figure 21) is provided with a suitable number of drilled bosses 59 which may receive screws adapted to be threaded into the bottom of base plate 39 to connect the outer cone thereto. This outer cone 50 also includes an inner annular flange 60 on the inner edge of which is formed an annular groove 61 in which is deposited a ring 62 of felt or the like. Groove 61 is, when the inner and outer cones 49 and 50 are assembled, adapted to receive a projecting portion 63 of the inner cone which, with the felt 62 in groove 61, forms a light trap preventing the passage of such illumination as may exist between the two cones (as will be described below). Shutter 32 is a between the lens shutter, and is accordingly adapted to be installed in inner cone 49 between the flanges 55 and 56 where it may be securely but detachably fastened in proper operative position in any convenient manner. Thus it may be seen that the inner and outer cone members 49 and 50 constitute an effective, rigid light-tight cone structure in which lens and shutter replacement may be readily effected without any necessity of adjustment to relocate the focal plane at the focal length of the lens system.

MAGAZINE

Magazine 33 (Figures 8–12) comprises a frame-like base 64 which defines an aperture 65 (Figure 9) of somewhat greater dimensions than the aperture 40 in base plate 39 (Figure 2A). Secured to and extending upwardly from base or frame 64 (Figure 10) is a rectangular enclosure 66 in the top edges of the four sides of which is formed a continuous groove or slot 67 (see also Figure 8) adapted to receive the bottom edge of a magazine cover (not shown) so that such cover forms with the four sides of enclosure 66 a light-tight chamber for the film. As shown in Figure 8, the right-hand wall 66a of enclosure 66 is not integral with the other walls, but is detachably secured thereto so that upon removal access may be had to the mechanism carried by a complementary inner wall 66b (Figure 10) which is of sufficient depth to provide a chamber for the reception of various magazine operating mechanisms to be described. Referring back to Figure 8, a crossbeam 68 is secured at its left-hand end to a support 69, in turn suitably secured to the left-hand side wall of enclosure 66, the other end of beam 68 being suitably attached to wall 66b. Wall 66b rotatably supports film supply and take-up pivots 70 and 71, respectively, complementary stationary pivots 72 and 73 being mounted at the opposite side of the magazine on a pair of arms 74 and 75, respectively. These arms are pivotally mounted on a pin 76 fastened in a bracket 78 forming an integral part of beam 68 and secured to support 69. Preferably a helical spring 79 is coiled about pin 76, the ends of this spring respectively engaging arms 74 and 75 to impart an inward bias thereto about pin 76 so that the pivots 72 and 73 are always urged toward their complementary pivots 70 and 71 to hold the film spools securely in proper operative position.

Beam 68 (Figures 8 and 9) has formed thereon an upwardly extending boss 80 which is drilled and threaded to receive an attaching screw (not shown) which extends through the magazine cover hereinbefore referred to, but not shown, and fastens the cover securely in place over the magazine. Also formed preferably integrally with beam 68 (Figure 9) is a downwardly extending drilled boss 81 in which is reciprocably disposed a pin 82 attached at its lower end to a pressure plate generally indicated at 83. A helical spring 84 is coiled around pin 82 and disposed between the bottom of boss 81 and the top of a boss 85 in which pin 82 is fastened to constantly urge the pressure plate 83 downwardly toward the focal plane which is the plane of the bottom of frame 64.

Fastened to the top of pressure plate 83 are a pair of upstanding lugs 86 and 87 to which are pivotally secured respectively a pair of arms 88 and 89. The ends of these arms are respectively attached to collars 90 and 91 (Figure 8) through which extends a shaft 92, the collars being fastened to the shaft, respectively, by pins 90a and 91a. The right-hand end of shaft 92, as viewed in Figure 8, has pinned thereto one end of a shaft 93, the other end of which is pinned to a sleeve 94 rotatably mounted in wall 66b, this sleeve carrying a lever arm 95 (see also Figure 10) for a purpose to be described below.

Referring back to Figure 8, the left-hand end of rod 92 is rotatably mounted in support 69 and carries on its end an arm 96 which overlies a cam 97 disposed between the left-hand wall of enclosure 66 and support 69. This cam 97 is pinned to a short shaft 98 which extends outside of the magazine through the left-hand wall of enclosure 66 and has fastened to its outer end an operating handle 99. This operating handle 99 also includes an extending lug 99a or the like adapted to coact with a cam-like spring 100 (Figure 1) to lock magazine 33 within the camera when the handle is turned to its vertical position, as shown in Figure 1, by reason of lug 99a entering behind spring 100. When, however, handle 99 is rocked counterclockwise, as viewed in Figure 1, to the horizontal position shown in Figure 8, lug 99 is moved from behind spring 100 so that the magazine may be slid out of the camera. Also, upon rocking of handle 99 counterclockwise to the Figure 8 position, cam 97 forces arm 96 upwardly, which rocks shaft 92 in such a manner that arms 88 and 89 and accordingly the lugs 86 and 87 attached thereto are pulled upwardly to pull pressure plate 83 (Figure 7) upwardly against the force of spring 84 away from the focal plane of the camera. With the pressure plate held in this upper position, a light slide 101 may be slid into a suitable groove 102 formed in base frame 64, thus effectively sealing the interior of the magazine from the entrance of light so that in the event a length of film is underlying pressure plate 83, it will not be spoiled by exposure to the light.

As shown in Figure 9A, the left-hand side 64a of base frame 64 is provided with a transverse chamber 103 to the top of which is fastened a strip 104 of flexible material, such as felt, and to the bottom of which is fastened a strip 105 of pile fabric which, with the felt strip 104, constitutes a light trap to prevent the entrance of light into the magazine when light slide 101 is withdrawn.

With the pressure plate 83 drawn to its upper position in the manner heretofore described, there is a tendency for the film underlying the pressure plate to sag to the dotted line position F in Figure 9A, wherein a substantial portion of the film thus forms an elongated loop lying below the level of the light slide groove 102. With the film in this position, it would be difficult if not impossible to insert the light slide without damaging the film. Accordingly, to facilitate the entrance of the light slide, we have provided a series of fingers or flippers 106 (see also Figure 8) regularly spaced along the entrance of groove 102 (Figure 9A) with their upper ends pivoted above the groove. Accordingly, when the light slide is inserted into its groove, its entering edge picks up the flippers 106 and pivots them upwardly. As the flippers thus pivot they pick up the adjacent edge of the film and raise it out of the path of the entering light slide. When the light slide is fully inserted, its handle 101a underlies the magazine lock handle 99; the latter handle cannot be operated to lock the magazine in proper operative position within the camera until the light slide has been removed, because handle 99 would engage the light slide handle before it could attain its locking position. Thus withdrawal of the light slide before the camera is put into operation is assured. By the same token, when lock handle 99 is in its locking position, it obstructs the entrance to groove 102, thus precluding entrance of the light slide when the magazine is locked into place.

Base frame 64 of the magazine includes a pair of opposed outwardly extending guide rails 107 and 108 (Figure 8), which when the magazine is placed in the camera, underride respectively a pair of L-shaped guides, such as guide 109 (Figure 2A) fastened to base plate 39. Also, the exterior side wall 66a (Figures 8 and 9) of the magazine enclosure 66 has fastened thereto a locating dowel 110 which is adapted to enter a tapered hole (not shown) formed in partition 43 (Figure 2A) when magazine 33 is slid into the camera to properly locate in cooperation with the aforementioned guide rails the aperture in the magazine relative to the focal plane aperture.

Pressure plate 83 (Figure 9) includes a chamber 111 having a port 112 in which is inserted a fixture 113 extending outwardly from the pressure plate through a vertical slot 114 formed in inner wall 66b, the outer end of the fixture lying between walls 66a and 66b and carrying one end of a flexible tube 115 (Figure 10). The other end of tube 115 is secured to a pipe 116 connected to a ported block 117 fastened to outer enclosure wall 66a (Figure 9), this wall having an opening (not shown) formed therein through which a short pipe 117a fastened to block 117 extends. The outer end of pipe 117a registers with an opening (not shown) in partition 43 (Figure 2A) to which is connected a pipe 118, any suitable means (not shown) being provided to effect an air-tight seal between the pipe 117a and the opening when the camera magazine 33 is properly positioned within its chamber 47. The other end of pipe 118 is connected to a valve 119 (see also Figure 15) in which is reciprocably disposed a plunger 120 having spaced gates 120a and 120b. Valve 119 includes a vertical passage 121 to which the upper end of pipe 118 is connected, a passage 122 which communicates the interior of the valve with the atmosphere and a passage 123 which by any suitable means (not shown) communicates the interior of the valve with a fitting 124 (Figures 1 and 2) which may be connected in any suitable manner to a suction generator or other evacuating device (not shown). Assuming the system thus connected to an evacuating device and the valve plunger 120 in the position shown in Figure 15, passage 122 is closed by gate 120b and a connection is made between such evacuating device and the interior of pressure plate 83 by way of fitting 124 (Figure 2), passage 123 (Figure 15), the interior of the valve, passage 121, pipe 118 (Figure 2A) the registering openings in partition 43, magazine wall 66a, block 117 (Figure 10), pipe 116, flexible tube 115, fitting 113 (Figure 9) and pressure plate port 112. With the inside of the pressure plate thus evacuated, and the plate itself suitably perforated as, for example, in the manner shown in the copending application Serial No. 510,146, filed November 13, 1943, now Patent Number 2,403,587, issued July 9, 1946, the film is drawn flat against the plate thus to prevent distortion. Of course, when valve plunger 120 (Figure 15) is moved to its upper position, all as will be described hereinafter, passage 123 is closed off by the gate 120a of the plunger, while passages 121 and 122 are communicated, thus connecting the interior of the pressure plate with the atmosphere to release the vacuum. It is this condition which exists during the film feeding operation, whereas the evacuation exists during and just prior to the exposure period.

As shown in Figure 10, magazine 33 includes a film supply spool 125 and a film take-up spool 126, the latter being driven by a gear 127 fastened to the take-up spool pivot 71 (Figure 8). Gear 127 (Figure 10) is adapted to be driven counterclockwise, as viewed in this figure, by means of a driving gear 128 through an idler 129 meshing with both the driving and driven gears, gears 128 and 129 being rotatably supported on magazine wall 66a (Figure 8). The pivot of driving gear 128 (Figure 10) comprises a coupling 130 which connects with the driving mechanism to be described hereinafter when magazine 33 is inserted in the camera in its operative position as heretofore described. Magazine 33 (Figure 8) includes at opposite sides thereof a roller 131 which underlies the film supply 125 (Figure 10) and a metering roller 132 (Figure 8) which underlies the film take-up spool 126 (Figure 10). The opposite ends of roller 131 (Figure 8) are rotatably mounted respectively in a pair of arms 133 and 134 which are, in turn, pivotally attached to the base frame 64 of the magazine. In a similar manner the opposite ends of metering roller 132 are respectively rotatably mounted in a pair of arms 135 and 136, also pivotally attached to the base frame of the magazine. Thus, both of these rollers 131 and 132 are capable of movement toward and away from their respective film spools as the film is wound from one spool to the other. Preferably a pressure roller (not shown) is disposed above metering roller 132 in such a manner as to press the film firmly against the metering roller to avoid any slippage therebetween and accordingly inaccurate metering.

The right-hand pivot 137 of metering roller 132 extends through arm 136 and through a vertical slot 138 (Figure 10) in magazine wall 66b and into the space between walls 66a and 66b (Figure 8). The free end of this pivot 137 (Figure 10) carries an upwardly extending arm 139, as well as a spur gear 140, the gear being fastened to the pivot so that when the gear is driven, as will be described, the pivot and accordingly its metering roller 132 is driven. In the upper end of arm 139 is fastened one end of a pin 141, the other end of which is fastened in one end of a link 142. Link 142 is pivotally supported by a coupling 143 which extends through and is rotatably mounted on a boss formed on the outer magazine wall 66a (Figure 8). Coupling 143 (Figure 10) has fastened thereto a pinion 144 which constantly meshes with an idler gear 145 rotatably attached as by a pin 146 on link 142. This idler gear 145 in turn meshes with a gear 147 which is rotatably mounted on pin 141 between arm 139 and link 142, gear 147 meshing with spur gear 145. It will now appear that when metering roller 132 is driven by the film during the winding cycle, the train of gears comprising gears 140, 147, 145, and 144 is driven, thus to drive coupling 143 for the purpose of correctly metering the film through the magazine in exactly the correct amount as will be described hereinbelow. The film is, of course, fed from the supply spool 125 (Figure 10) and passes therefrom around then under roller 131 (Figure 8). As noted hereinbefore, metering roller 132 is capable of movement toward and away from take-up spool 126 but because of the mounting of gear 140 on pivot 137 and gears 147 and 145 on link 142, these gears constantly remain in mesh thus to maintain a driving relation there-among regardless of the vertical movement of the metering roller relative to take-up spool 126.

In order that the momentum engendered in supply spool 125 during the feeding cycle does not result in continued rotation of this spool subsequent to the winding cycle and to maintain the film taut at all times, we have provided a brake which is generally indicated at 148 in Figures 10 and 11. As may be seen in Figure 11, supply spool pivot 70 is pinned to a stud 149 which extends through magazine wall 66b where a reduced portion 149a of the pivot carries a helical spring 150. The left-hand end of this spring presses against a shouldered bushing 151, the shoulder of which rests against the complementary shoulder of a bearing member 152 mounted in a suitable bore in wall 66b. The right-hand end of spring 150 presses against a collar 153 which is pinned to the right-hand end of stud 149 so that spring 150 exerts a constant bias on the stud tending to force it to the right.

Secured to pivot 70 is a friction plate 154 which is pressed by spring 150 against a number of friction members 155 such as cork buttons or the like mounted on a plate 156 in turn attached to a disc 157 which is freely mounted on the larger diameter of stud 149 for rotation relative thereto. The lower portion of disc 157 carries a pin 158 which extends therefrom through a slot 159 formed in wall 66b, and to the outer end of this pin 158 (Figure 10) is pivotally fastened one end of a link 160. The other end of link 160 is pivotally attached to the upper end of lever arm 95, the lower end of which, as noted hereinabove, is fastened to shaft 93 (Figure 8). As may be seen in Figure 8, the right-hand end of shaft 93 is rotatably mounted in a bushing 161 mounted in the magazine side wall 66a, and the extreme end of this shaft has fastened thereto a coupling 162 which connects with a portion of the driving mechanism to be described, when the magazine is inserted in its operative position within the camera.

It will now appear that arm 95 (Figure 10) is connected by way of shafts 93 and 92 (Figure 8) to arm 96 which, as heretofore described, is rocked upwardly when handle 99 is turned to its horizontal position to unlock the magazine for withdrawal from the camera. Accordingly, when the handle is so turned, lever 95 (Figure 10) is rocked counterclockwise, which results in clockwise movement of pin 158 about the axis of stud 149. This movement of pin 158 is imparted to disc 157 (Figure 11) and accordingly to plate 154, thus rotating supply spool 125 (Figure 10) clockwise by a sufficient amount to take up such slack as may exist in the film resulting from elevation of pressure plate 83 (Figures 8 and 9) caused by movement of handle 99 to the horizontal position shown. Thus the film is substantially, if not entirely drawn upwardly against the elevated pressure plate 83 to permit the entrance of light slide 101 in its slot. Of course, if the film is not entirely out of the way, then the action of fingers 106 (Figures 8 and 9A) as heretofore described, elevates one edge of the film to permit the entrance of the light slide.

Of course, when handle 99 is rocked to its Figure 1 position, the bottom of pressure plate 83 is urged toward the focal plane of the camera, as heretofore defined, by reason of the downward pressure exerted by spring 82 (Figure 9). It is desirable, however, that the left-hand edge of pressure plate 83 (i. e., the edge which underlies take-up spool 126 Figure 10) first engage the film and press it against the periphery of aperture 40 (Figure 2A) in the camera base 39, as take-up spool 126 (Figure 10) is constrained against clockwise or unwinding rotation by a pair of ratchets 163 and 164 which prevents withdrawal of film from the take-up spool. If the film were first engaged by the pressure plate at a point below supply spool 125, sufficient slack could not be drawn from take-up spool 126 to allow the pressure plate to seat properly in the focal plane without damaging the film or the mechanism. Accordingly, as shown in Figure 12, the left-hand portion of pressure plate 83 is first forced into the focal plane P by a lever 165 which is pivotally mounted on shaft 92 (Figure 8), the pressure exerted by the lever being provided by a spring 166 fastened between one end of the lever and a suitable arm 167 connected to and extending from beam 68. The right hand side of pressure plate 83 (Figure 12) is forced down into the focal plane P by a linkage system generally indicated at 167. This linkage system comprises an adjustable link 168 having its left-hand end pivotally attached to arm 95 and its right-hand end attached to one arm 169 of a bell crank lever generally indicated at 170 which is pivotally mounted on a shaft 171, the ends of which are rotatably mounted in opposite walls of the magazine. Bell crank 170 includes an arm 172, the free end 173 of which is disposed within a cam block 174 wherein it is engageable with a pair of cam surfaces 175 and 176. It accordingly follows that when bell crank 170 is rocked clockwise, as viewed in Figure 12, arm end 173 rides along cam surface 176, thus allowing the right-hand end of the pressure plate to depress against the focal plane and ultimately rest against cam surface 175 which, in effect, constitutes a shoulder which locks the pressure plate in its proper position in the focal plane. This clockwise rocking of the bell crank is effected by the driving mechanism during a portion of its operative cycle, as will be hereinafter described, at the time the air inside of the pressure plate is evacuated. Thus the pressure plate not only forces the film into the focal plane, but by reason of its evacuation flattens all portions of the film against its bottom surface, thus precluding any possibility of distortion when an exposure is made.

Inasmuch as a certain amount of film slack is desirable during this movement of the right-hand end of pressure plate 83 into the focal plane, this movement is accompanied by counterclockwise movement of supply spool 125 (Figure 10) through the operation of arm 95 and link 160 hereinabove described, which cause a sufficient amount of film to be unwound from spool 125 to prevent the lowering of the pressure plate from tearing or otherwise damaging the film. Thus it may be seen that the film may effectively be forced and held in the focal plane without any danger of damaging the film, or without displacing the portion to be exposed relative to the portion exposed during the immediately preceding cycle.

DRIVING MECHANISM

1. *Shutter spring rewind*

The driving mechanism for the camera functions during its cycle of operation to operate the previously described film magazine 33 and to rewind the shutter. The motive force for the driving mechanism is motor 48 (Figure 14) which is fastened to a partition 44. The casing of motor 48 includes a bracket 177 which houses a gear (not shown) fastened to the rotor shaft of the motor. This gear meshes with a spur gear 178 secured to a stud shaft 179 rotatably mounted in a boss 180 formed integrally with a bracket 181 attached to partition 44. Also secured to shaft 179 is a pinion 182 which meshes with a gear 183 mounted on a shaft 184 which is journaled in bracket 181. One end of shaft 184 is pinned to one end of a sleeve 185, the other end of which is pinned to a shaft 186 which is rotatably mounted in the opposite sides 34a and 34b of case drive 34.

Shaft 186 carries a pinion 187 which meshes with a spur gear 188 fastened to a shaft 189, the opposite ends of which are rotatably mounted in the case drive walls 34a and 34b. This gear 188 in turn meshes with a gear 190 which is rotatably mounted in any suitable manner on case drive side wall 34a. This latter gear, in turn, meshes with a gear 191 secured to a clutch element 192 rotatably mounted on a shaft 193 whose opposite ends are supported in the case drive side walls 34a and 34b. A complementary clutch element 194 is also mounted on shaft 193, and when the two clutch elements are engaged, shaft 193 is driven to rotate a gear 195, as well as a cam 196, both of which are fastened to the end of shaft 193 which extends externally of case drive side wall 34b.

Gear 195 meshes with an idler 197 which, in turn, meshes with a pinion 198 secured to a shaft 199, one end of which is mounted in case drive side wall 34b; the other end of this shaft being mounted in a vertically extending portion 200a of a bracket 200 secured to partition 44. The outer end of shaft 199 carries a bevel gear 201 which, as is more clearly shown in Figure 16, meshes with another bevel gear 202 fastened to a shaft 203, the opposite ends of which are rotatably mounted in the top and bottom walls of bracket 200. The lower end of shaft 203 extends through the lower wall of bracket 200 and has secured to it the upper end of a connecting sleeve 204 (see Figure 2A), the lower end of this sleeve being connected to an input drive shaft 206 (see also Figure 16) of what may be termed a transfer unit generally indicated at 207. This unit transfers the winding and tripping output drive of case drive 34 to the camera magazine, the shutter, and various elements associated therewith, all as will be described in detail hereinbelow.

The lower end of shaft 206 has pinned thereto a bevel gear 208 (Figure 17), the hub of which is mounted in a ball bearing 209 supported in the housing 210 of transfer unit 207. Bevel gear 208 meshes with a bevel gear 211 pinned to a shaft 212, the opposite ends of which are mounted in ball bearings 213 and 214, carried by transfer unit housing 210. Fastened to the hub of bevel gear 211 is a gear 215 (see also Figure 3) which meshes with a gear 216 carried by a stud shaft 217 rotatably mounted in the downwardly extending portion 52 of base plate 39. The inner end of stud shaft 217 (Figure 3) has fastened thereto a gear (not shown) which, through a conveniently arranged train of gears 217a (not all of which are shown) drives a coupling 219 (Figure 4) adapted to be connected to a complementary coupling 220 (Figures 6 and 7) of shutter 32 by a connector 221 interposed between the two couplings and rotatably carried in flange 55 (Figure 3) of the inner cone 49. Coupling 220 (Figure 7) is, in turn, connected to a spring 222 in shutter 32 which, when under tension and upon release, opens and closes the shutter leaves, as will be described hereinafter.

It may now be seen that when motor 48 (Figure 14) is energized, power is transmitted by way of gears 178, 182, 183 and sleeve 185 to case drive 34, and, assuming that clutch elements 192 and 194 are engaged, the case drive output is transmitted by gears 195, 197 and 198, bevels 201 (Figure 16) and 202, and connector 204 to the input shaft 206 of distributor 207. Shaft 206, in turn, drives bevels 208 (Figure 17) and 211, which causes rotation of gear 215 (Figure 3) to drive coupling 219 (Figure 4) which, being connected to coupling 220 (Figure 7) by connector 221, rewinds the shutter spring 222.

DRIVING MECHANISM

2. *Magazine drive*

As pointed out before, the distributor or transfer unit 207 (Figure 16) also operates and controls the film magazine. Thus, gear 215, which is driven clockwise, as viewed in this figure, meshes with a gear 223 (Figure 17). This gear is more clearly shown in Figure 13, being cut on one end of a clutch element 224. This clutch element has freely mounted thereon a cylindrical member 225, on one end of which is fastened a ratchet 225a. One end of a spring 226 which is coiled about the reduced end of the clutch element is fastened to ratchet 225a. The clutch element 224 is rotatably mounted on a sleeve 227, the opposite ends of which are journaled respectively in ball bearings 228 and 229, which are suitably secured in housing 210 of the transfer unit 207. Disposed within sleeve 227 is a shaft 230, and this shaft is prevented from rotating within the sleeve by a pin 231 which extends through both. A complementary clutch element 232 is also mounted on sleeve 227 but is fastened thereto, a portion of spring 226 also being coiled about clutch element 232. Thus it may be seen that spring 226 is coiled about both of the clutch elements 224 and 232, and is disposed between the clutch elements and cylinder 225 so that when the clutch is disengaged, clutch element 224 is capable of rotation relative to clutch element 232. A spring 233 is disposed in sleeve 227 between the bottom thereof and one end of shaft 230. The other end of shaft 230 carries a coupling 234 which is adapted to engage coupling 130 (Figure 10) of mechanism 33 when the mechanism is installed in the camera. The clutch and its shaft 230 are axially movable into unit 207 against the pressure of spring 233 so that the magazine may be properly positioned in the camera although coupling 234 and coupling 130 do not mate when the magazine is installed.

It may now be seen that when gear 223 (Figure 13) is rotated, clutch element 224 is rotated; and if ratchet 225a is unrestrained, spring 226 binds about both clutch elements and accordingly shaft 230 is driven, thus to drive the connected couplings 234 and 130 (Figure 10), and hence rotate the film take-up spool 126 counterclockwise by way of the train of gears 128, 129 and 127.

As the film is wound on take-up spool 126 it, i. e. the film, drives metering roller 132 (Figure 8) and accordingly coupling 143 (Figure 10) by way of the train comprising gears 140, 147, 145 and 144. This coupling is attached (when the magazine is installed in the camera) to a complementary coupling 235 in Figure 13, which is mounted on one end of a shaft 236 rotatably mounted in transfer unit 207. Thus the coupling end of shaft 236 extends through a bushing 237 carried by a ball bearing 238 secured to housing 210 of the transfer unit. The other end of shaft 236 is reciprocably mounted in a telltale 239 which is also mounted in a ball bearing 240 secured to the transfer unit housing 210.

Telltale 239 has a marked outer end 239a (Figure 2A) which extends through a hole formed in the transfer unit housing 210, where it is clearly visible through a hole in the covering plate (not shown) attached to this side of the camera so that it is not necessary to remove the magazine from the camera to determine whether or not the film is being wound.

Referring back to Figure 13, shaft 236 carries a clutch generally indicated at 241 comprising driving and driven elements 242 and 243, respectively, the former element having secured thereto a friction facing 242a, the driven element being attached in any suitable manner to a metering cam 255. Driving element 242 includes a slotted collar or hub 244 and a pin 245 extends through the slot in collar 244 and through shaft 236 so as to couple clutch element 242 to the shaft, while permitting movement of the clutch element axially of the shaft. A spring 246 is coiled around shaft 236 between the end of clutch element hub 244 and the inner end of telltale 239 so as to force the friction face 242a of clutch element 242 against clutch element 243 to effect a driving relation therebetween. A collar 247 is loosely mounted on clutch element hub 244 and between this collar and a lock nut 248, which holds telltale 239 in place, is another spring 249. Inasmuch as collar 247 bears against pin 245, shaft 236, clutch 241, and metering cam 255 are forced outwardly of the transfer unit housing 210.

Thus the assembly comprising coupling 235, shaft 236, and the elements carried thereby, may be pressed or forced into the transfer unit housing 210 in the event that coupling 235 does not mate with its complementary magazine coupling 143 (Figure 10) when magazine 33 is installed in the camera. As coupling 143 is driven in the manner described, it soon mates with coupling 235 (Figure 13) whereupon spring 249 forces shaft 236 and its coupling 235 outwardly.

Thus it may be seen that as the metering roller drives shaft 236 as the film is being wound on take-up spool 126 (Figure 10), metering cam 255 (Figure 13) is rotated.

Referring back to Figure 17, the hub of bevel gear 211 has fastened thereto a cam 256 which rotates with the gear during the winding cycle. One end of an arm 257 is adapted to ride on the periphery of cam 256 (Figure 16), the other end of this arm being pivotally mounted on a pin 258 fastened to one side of the transfer unit housing 210. As is more clearly shown in Figure 18, arm 257 includes a projection 259 on the end of which is a lip 260 adapted to engage the bottom of an arm 261 fulcrumed on pivot 258. The free end of arm 261 is provided with a hooklike lip 262 which drops into a notch 255a formed in metering cam 255 at the end of the winding cycle. Arm 257 (Figure 16) is under a clockwise bias by a spring 263, one end of which is fastened to the arm, and the other end of which is fastened to transfer unit housing 210. The spring thus holds the free end of arm 257 in engagement with the periphery of cam 256 at all times. Arm 261, on the other hand, is under a counterclockwise bias by reason of a spring 264 fastened between the two arms. This latter spring thus tends to force the free end, i. e. the hook 262 of arm 261, into engagement with metering cam 255 so that the hook can enter the cam notch 255a at the proper time.

At the beginning of the winding cycle, the two arms 257 and 261 (Figure 18) and cams 255 and 256 are in the position shown. Accordingly, as cam 256 is rotated by the case drive through the transfer unit, as hereinbefore described, the free end of arm 257 rides on the periphery of the cam until a notch 256a is juxtaposed to the arm. At this point spring 263 (Figure 16) rocks arm 257 clockwise so that its free end falls in cam notch 256a (Figure 18) thus engaging lip 260 with arm 261 to rock this latter arm clockwise about its pivot which retracts hook 262 from notch 255a in metering cam 255, thus freeing this cam for rotation by the metering roll 132 (Figure 8) as film is wound on the take-up spool 126 (Figure 10) all as heretofore described.

As cam 256 continues to rotate clockwise, as viewed in Figure 18, the free end of arm 257 is forced out of notch 256a, the arm accordingly being rocked counterclockwise to retract its lip 260 from arm 261. This permits spring 264 to pull arm 261 counterclockwise, but as metering cam 255 has by this time rotated its notch 255a away from hook 262, the hook merely rides on the periphery of the cam until the notch 255 underrides the hook at the end of one revolution. Thus arm 261 is maintained in a position slightly raised from that shown in Figure 18, for one revolution of metering cam 255. Arm 261 is held in this position for this period in order to hold a pawl 265 carried thereby out of engagement with the teeth of ratchet 255a.

When the pawl and ratchet are disengaged, clutch elements 224 and 232 (Figure 13) are connected by spring 226 to complete the driving connection between the case drive and the magazine, as heretofore described. When, however, the pawl 265 and ratchet 225a (Figure 18) reengage by reason of arm hook 262 entering metering roller notch 255a, then the clutch comprising elements 224 and 232 (Figure 13) is disengaged, thus breaking the driving connection between the case drive and the magazine. It accordingly follows that by properly proportioning the metering cam 255 and the gear train between it and the metering roller 132 (Figure 8) the exact amount of film may be fed during each film feeding cycle.

During the film winding cycle, i. e. when film is being fed from supply spool 125 (Figure 10) to take-up spool 126, as just described, it is necessary that pressure plate 83 (Figure 9) be raised out of the focal plane so as to permit free passage of the film beneath the plate. To this end, transfer unit 207 (Figures 13, 16 and 19) is provided with a transverse shaft 266 whose opposite ends are carried respectively by bushings 267 and 268 (Figure 13) disposed on opposite sides of the transfer unit housing 210. A collar 269 is pinned to shaft 266 adjacent bushing 268 and has fastened thereto an L-shaped arm 270 (Figure 16) on the lower end of which is mounted a roller 271 adapted to ride on and follow the periphery of a cam 272 which is fastened on so as to rotate with shaft 212. To the other end of shaft 266 (Figure 13) is secured a coupling 273 which mates with coupling 162 (Figure 10) when magazine 33 is installed in the camera. It will be recalled that coupling 162 (Figure 8) is connected to shaft 92, and hence, by way of arms 88, 89 and lugs 86 and 87 to pressure plate 83. Coupling 162, as viewed in Figure 10, is accordingly under a constant clockwise bias by spring 82 (Figure 9) which is accordingly imparted by way of coupling 273 (Figure 13) and shaft 266 to arm 270 (Figure 16) which forces the arm's rollers 271 against the periphery of cam 272. When, therefore, in the course of the rotation of cam 272 roller 271 rides into a notch 272a formed in the cam, arm 270 rocks clockwise to the limit of its motion in this direction, at which time the pressure plate is free to be forced into its focal plane position by spring 82 (Figure 9). This occurs at the end of the winding cycle after a new strip of film has been fed into position over aperture 49 (Figure 2A) in the camera base plate 39.

After the shutter has been tripped, which effects operation of case drive 34, as will be described hereinafter, the winding cycle is begun, and accordingly cam 272 (Figure 16) starts to rotate. Immediately, arm roller 271 is forced out of cam notch 272a, with the result that arm 270 is rocked counterclockwise. This counterclockwise movement of the arm results in counterclockwise movement of coupling 162 (Figure 10) which is imparted to shaft 92 (Figure 8). This movement of the shaft lifts arms 88 and 89, and accordingly lugs 86 and 87 upwardly, thus raising pressure plate 83 from its focal plane position against the pressure of spring 82 and accordingly out of engagement with the film, so that the film may be drawn thereunder, as described. Thus it will appear that the pressure plate is positively driven from its focal plane position, thus precluding any possibility of its remaining therein during the film winding cycle, where it might well tear or otherwise damage the film.

To preclude any possibility of the film being wound or fed prior to elevation of pressure plate 83 (Figure 9) out of the focal plane, thus to prevent the film being scratched or otherwise damaged by the pressure plate, shaft 266 (Figure 13) has freely mounted thereon a collar 367 to which is fastened a pawl 368 (Figure 16) which is biased clockwise by spring 360 toward clutch ratchet 225a. Shaft 266 (Figure 13) has a collar 370 fastened thereto, this collar carrying a lug 371, to which is secured a pin 372 which underlies, as viewed in Figure 16, the upper end 368a of pawl 368. Thus, when arm 270 is rocked counterclockwise, as viewed in Figure 16, in the manner hereinbefore described, pawl 368 is also rocked counterclockwise by pin 372, thus to free the pawl from ratchet 225a to condition the clutch for engagement when pawl 265 (Figure 18) on arm 261 is disengaged from the ratchet. It may accordingly be seen that in the event of inadvertent disengagement of ratchet 225a by pawl 265 prior to the removal of the pressure plate from the focal plane, pawl 368 (Figure 16) keeps the clutch disengaged, thus precluding movement of the film until the pressure plate is drawn out of the path of movement of the film.

It is, of course, important that the pressure plate 83 (Figure 9) be raised out of its focal plane position prior to engagement of clutch elements 224 and 232 (Figure 13), which results in feeding of the film. To this end, notch 272a of cam 272 (Figure 16) is disposed in advance of notch 256a of cam 256 in the direction of their rotation so that arm 270 is rocked counterclockwise to raise the pressure plate as described, before the end of arm 257 falls into notch 256a of cam 256 to disengage pawl 265 (Figure 18) from ratchet 225a, which permits engagement of clutch elements 224 and 232 (Figure 13).

As noted above, the film is held flat against the bottom of pressure plate 83 (Figure 9) during the exposure period, by the creation of a vacuum inside the pressure plate through operation of the valve structure shown in Figure 15. It is accordingly necessary that this vacuum be destroyed prior to the film feeding or winding cycle, in order that the film may readily move beneath the pressure plate. To this end cam 196 (Figure 16) which, as described above, is attached to gear 195 so as to rotate therewith upon engagement of the case drive clutch has a notch 196a formed therein characterized by an abrupt shoulder 196b and a less abrupt shoulder 196c. Pivotally secured to side 34b (Figure 14) of the case drive housing, as at 274, is a lever generally indicated at 275 (Figure 16) on the left-hand end of which is formed a hook 276 which rides into cam notch 196a when the cam is in its Figure 16 position. The other end 277 of the lever 275 has a pin 278 extending therefrom which, as is shown in Figures 2A and 15, lies between a cap 279 and a collar 280 on the upper end of valve plunger 120. As shown in Figure 16, lever 275 is under a clockwise bias of a spring 281 connected between the arm and the side of the case drive housing, this spring accordingly holding the hook end 276 of the arm against the periphery of cam 196. With the cam and arm in their Figure 16 positions, valve plunger 120 (Figure 15) is in the position shown, wherein the interior of pressure plate 83 (Figure 8) is in communication with the suction generator (not shown). However, when case drive 34 (Figure 16) begins to operate immediately after the shutter is tripped (as will be described below), and the film winding cycle is thus commenced, cam 196 begins to rotate clockwise, thus forcing its shoulder 196c against hook 276, rocking lever 275 counterclockwise, as viewed in this figure, against the pull of spring 281, to lift the right-hand end of the lever and accordingly pull valve plunger 120 (Figure 15) upwardly. Thus passageway 123 (which leads to the suction generator) is blocked by gate 120a, and passages 121 and 122 are communicated so that the interior of pressure plate 83 (Figure 9) is opened to the atmosphere to destroy the vacuum. This operation of the valve to destroy the vacuum occurs as arm 270 (Figure 16) is being rocked counterclockwise to elevate the pressure plate, as described, and prior to the clockwise movement of arms 257 and 261, which results in the connection between the case drive and magazine which effects feeding of the film.

Thus it will appear that not only does the pressure plate raise out of the focal plane, but also the vacuum in the pressure plate is destroyed, thus completely freeing the film before any driving or feeding impetus is imparted thereto.

DRIVING MECHANISM
3. *Shutter tripping*

A complete cycle of operation of the camera chronologically comprises: tripping of the shutter, resetting of the shutter trip, and simultaneous magazine operation and shutter spring rewind, the magazine operation and shutter spring rewind being accomplished as described above. Tripping of the shutter initiates operation of the case drive, as will now be described.

As shown in Fig. 14, a main shutter trip shaft 282 is adjustably connected to one arm of a bell crank 283 mounted on a pivot 284 fastened to and extending upwardly from plate 44. The other end of trip shaft 282 is fastened to a collar 285 which is pinned to one end of a lever 286 by a pin 287. The other end of lever 286 is fastened to a vertical shaft 288, the lower end of which is mounted in a boss formed on the top of partition 44, and the upper end of which extends through top plate 45 (Figure 2) and has fastened to its end a manually operable trip lever 289 by which the camera may be manually tripped locally.

Referring back to Figure 14, the other arm of bell crank 283 is pivotally connected to one end of a transverse link 290, the left-hand end of which, as shown in Figure 16, is pivotally connected to a hook 291 which is mounted for oscillation about a pin 292 extending from one wall of the case drive housing. The free end 291a of hook 291 is adapted to engage with the hook-shaped end 293 of a latch plate 294 which is attached to a transverse shaft 295 (see also Figure 14). The opposite ends of this shaft are pivotally mounted in side walls 34a and 34b of case drive 34.

At this point it might be well to note that case drive 34 resembles in many respects that shown in United States Letters Patent 1,612,860 to Sherman N. Fairchild. Thus, latch plate 294 includes an arm 296, as well as a pin 297 which is fastened in and extends from the hook end 293, this pin constituting an anchor for one end of a relatively heavy spring 298, the other end of which is anchored in any suitable manner to the case drive housing. Thus it may be seen that when hooks 291a and 293 are disengaged by movement of the trip shaft 282 (Figure 14) operating through bell crank 283 and link 290, spring 298 (Figure 16) rocks latch plate 294 clockwise to move arm 296 upwardly away from clutch elements 192 and 194 (Figure 14) causing engagement therebetween, thus instituting driving operation of case drive 34. A more detailed description of these parts and the operation thereof may be had by reference to the above-noted Fairchild patent.

When latch plate 294 (Figure 16) rocks clockwise, as described, shaft 295 is similarly oscillated, as also is a lever 299 which is fastened to the outer end of the shaft. The lower end of this lever is pivotally connected to the right-hand end of a transverse link 300, the other end of which, as may be seen in Figure 14, is pivotally connected to one arm of a bell crank 301 which is fastened to a pin 302 (see also Figure 16) pivotally mounted in bracket 200. The other arm 303 of bell crank 301 (Figure 14) is connected to one end of a heavy spring 304 whose other end is anchored to partition 44 by a pin 305. This spring 304 constitutes a booster to assure tripping of the shutter upon disengagement of hooks 291a and 293 (Figure 16).

As shown in Figure 16, the lower end of pin 302 is fastened to a connector sleeve 306, the lower end of which is, in turn, fastened to the upper end of a shaft 307 pivotally mounted in transfer unit housing 210. This shaft 307 extends below the transfer unit and has connected to its lower end a lever 308, carrying a pin 309 which, as shown in Figure 3, is secured to one end of a link 310. Link 310 extends through a slot 311 formed in the downwardly extending portion 52 of camera base plate 39 into the inner cone 49 (Figure 4) where it is pivotally connected to an arm 312 fastened to a shaft 313 mounted for oscillation in bracket 218. To the other end of shaft 313 is fastened a coupling 314 which is adapted to mate with a connector 315 (Figure 7) pivotally carried in flange 55 of inner cone section 51 (Figure 3) when shutter 32 is mounted therein. Connector 315 (Figure 7) mates with a trip shaft 316 of shutter 32, which may be rocked to trip the camera shutter, as will be described hereinafter.

It will now appear that the camera shutter may be tripped as follows: lever 289, (Figure 2) upon being rocked, drives trip shaft 282 (Figure 14) to pivot bell crank 283 counterclockwise, thus to move link 290 to the right. This movement of link 290 (Figure 16) disengages hooks 291a and 293, permitting spring 298 to rock latch plate 294 and accordingly lever 299 clockwise. This movement of lever 299 is transmitted into angular movement of shaft 307 by reason of its connection thereto by bell crank 301 and sleeve connector 306. The angular movement of shaft 307 is imparted to lever 308 which, through pin 309, drives link 310 (Figure 4) in such a way as to rock or oscillate coupling 314 and accordingly trip shaft 316 (Figure 7) thus tripping the shutter.

The shutter trip is re-set as follows: it will be recalled that when the shutter trip is operated, operation of case drive 34 (Figure 16) is initiated by reason of the raising of arm 296 to effect clutch engagement. As the case drive operates, shaft 193 rotates counterclockwise and accordingly imparts counterclockwise rotation to a cam 311 fastened thereto. As this cam rotates, it engages a roller 318 fastened to the lower part of latch plate 294, and rocks the latch plate counterclockwise against the pull of spring 298 until the latch plate hook 293 and hook 291a reengage, hook 291a having been returned to its Figure 16 position by means of a spring 319 (Figure 14) which constantly pushes trip shaft 282 in a direction to rock bell crank 283 clockwise and accordingly link 290 to the left. This return movement of latch hook 293 to its Figure 16 position accordingly moves link 290 to the right, and this movement of the link is imparted in the manner hereinbefore described to shutter trip shaft 316 (Figure 7) to reset the shutter trip elements, which will be described later.

To prevent the shutter from being tripped if the magazine is not properly installed, shaft 307 (Figure 20) has fastened thereto a locking plate 320 which oscillates as the shaft is moved in the manner hereinbefore described. When the shutter is fully wound, locking plate 320 is in the position shown in Figure 20, but when the shutter is tripped, this place is rocked counterclockwise to a position where its end 320a lies somewhat to the right of the depicted position, unless prevented from so doing by latching against the end 270a of arm 270 (Figure 16). This latching will occur only when couplings 273 (Figure 13) and 162 (Figure 10) are not properly engaged, thus permitting spring 270b to rock arm 270 counterclockwise until the limit of its travel has been attained when its end 270a is in contact with end 320a of locking plate 320.

Thus it is evident that should the magazine be left out or improperly installed, the shutter may not be intentionally or inadvertently tripped, thus obviating any possibility of spoiling the film.

As shown in Figure 16, the bottom end 307a of shaft 307 has another arm and pin 321 and 322, respectively, fastened thereto. Pin 322 extends downwardly into the space between inner and outer cones 49 and 50 (Figure 3) wherein it engages one end 323 (Figure 21) of a counter actuating arm 324 pivotally mounted as at 325 on the outer cone assembly. The other end 326 of this arm is positioned to engage the operating arm 327 of a counter 328 which forms a part of the recording system 36 described hereinbelow. Thus it follows that every time the shutter is tripped, counter 328 is actuated so that successive exposures are counted and recorded.

Preferably another counter 329 (Figure 2) is provided in the top of the camera where it is visible to the operator. This counter is also actuated every time an exposure is made by means of an arm 330 (Figure 16) attached to lever 275 which, as described above, is rocked once during each cycle of operation. Arm 330 is conveniently arranged to engage the operating lever (not shown) of counter 329 in the same manner that arm end 326 (Figure 21) engages the operating lever 327 of counter 328.

SHUTTER

1. *Tripping and resetting*

As shown in Figure 7A, shutter 32 includes a main supporting plate 331 to which are attached practically all of the shutter elements. Inasmuch as the shutter and diaphragm leaves are more or less conventional in character, it will suffice to say that the shutter leaves 332 (Figure 7B) and diaphragm leave 333 are operatively disposed between a disc 334 fastened to supporting plate 331 and lower supporting plates 335 (Figure 7A). The diaphragm leaves 333 (Figure 7B) are operated through a gear 336 by mechanism to be described hereinafter, while the shutter leaves 332 (Figure 5) are opened and closed by a link 337, the driven end 337a of which is eccentrically and pivotally connected as at 338 to a driving gear 339. This gear 339 is in turn driven by a gear 340 when the shutter spring 222 (Figure 7) is released in a manner to be described.

Fastened to supporting plate 331 (Figure 7A) as by screws 341, is a bracket generally indicated at 342, having an upper face 343 (Figure 7) through which previously described couplings 220, 316 and 374 extend. Coupling 220 forms the upper part of a spring cup 344, the annular groove 334a of which houses the attached upper end of shutter spring 222. The coupling end 220 of the spring cup is journaled in a bushing 345 carried by bracket top 343, while within the cup is disposed a bushing 346 in which the upper end of a shaft 347 is rotatably disposed. This shaft extends downwardly through bracket 342 and near its lower end has an enlarged portion 347 which is journaled in a bushing 348 mounted in the shutter supporting plate 331. The lower end 347a of shaft 347 extends below plate 331 and has fastened thereto gear 340 which, as noted above, meshes with, so as to drive the shutter leaf operating pinion 339. A lower spring cup 349 is fastened to shaft 347 between the ends thereof in any suitable manner, this latter spring cup including an annular groove 349a which receives the attached lower end of shutter spring 222. Also secured to the lower end 347a of shaft 347 are a pair of cams 350 and 351 by which rotation of the shaft is controlled. It thus follows that when tripping operation of the camera is effected, as hereinbefore described, cams 350 and 351 are released by mechanism to be described, so that spring 222 may rotate lower spring cup 349, the upper spring cup 344 being held against rotation by case drive 34 which is locked at the time of shutter tripping. Accordingly shaft 347 is rotated to drive gears 340 and 339 and accordingly link 337, thereby opening and closing shutter leaves 332 (Figure 5).

Coupling 316 (Figure 7) is formed on the upper end of a shaft 352, the lower enlarged portion 352a of which is journaled in a bushing 353 fastened to the shutter supporting plate 331. This shaft 352 has pinned thereto between its ends an arm 354 carrying a downwardly extending pin 355 adapted to engage the free end of a lever 356 secured to a shaft 357. The upper end of this shaft is journaled in the top 343 of bracket 342 (see Figure 7B), the lower end thereof extending through supporting plate 331 (Figure 7) and having secured thereto a latch 358. This latch 358 (Figure 5) has a hook 359 at its end which engages, when in the Figure 5 position, one shoulder 360 of cam 350, this cam also having a diametrically opposed shoulder 361.

It may now be seen that when coupling 316 (Figure 7) is rocked to trip the shutter by operation of the tripping linkage hereinabove described, shaft 352 is turned counterclockwise, as viewed in Figure 5, in order to rotate lever 356 and accordingly shaft 357 in a clockwise direction. This motion of the shaft 357 is, of course, imparted to latch 358 which is rocked clockwise, as viewed in Figure 5, sufficiently to withdraw hook 359 out of engagement with cam shoulder 360, thus freeing the cam and accordingly the shaft 347 (Figure 7) to permit operation of shutter spring 222 to drive the shutter leaves as described.

Preferably mechanism is provided to limit the rotation of shaft 347 and accordingly gear 340 (Figure 5) to 180° per operative cycle, this being sufficient to open and close the shutter as the ratio between gears 340 and 339 is as two is to one. To this end the lower end of shaft 352 (Figure 7) has a cap 362 which pivotally and eccentrically carries a lever 363 (see also Figure 5). The lower end of shaft 352 (Figure 7) also pivotally supports another lever 364 which, as is more clearly shown in Figure 5, is connected to lever 363 by a link 365 pivotally connected to each of the levers. Lever 364 coacts with shoulders 360 and 361 on cam 350 whereas lever 363 coacts with cam 351 as will now be described. When shaft 352 (Figure 7) is rocked by the tripping mechanism to trip the shutter, latch hook 359 (Figure 5) is withdrawn from one of the shoulders on cam 350, as pointed out above. At the same time lever 363 is moved to the right, as viewed in Figure 5, by reason of its eccentric connection to shaft 352, so as to move the free end 363a of this lever into the path of one rise 351a of cam 351. As this cam rotates it engages lever end 363a which is accordingly rocked clockwise. By reason of the interconnection between lever 363 and 364 by link 365, lever 364 is also rocked clockwise so that its free end 364a is swung downwardly into the path of that shoulder of cam 350 which has been released by the withdrawal of hook 359. Thus rotation of cam 350 is limited to 180°.

As pointed out hereinabove, the shutter tripping mechanism just described is automatically reset by case drive 34 (Figure 16) and in the course of this resetting operation (referring back to Figure 5), shaft 352 is rocked clockwise. This movement is transmitted by way of pin 355, lever 356 and shaft 357 to latch 358 so as to rock the latch counterclockwise, as viewed in Figure 5, to replace its hook 359 in front of one of the shoulders on cam 350. Thus latch 358 is reset in locking position. As the latch is reset a pin 366 carried thereby engages lever end 363a, rocking the lever back to the position shown in Figure 5, wherein it may be reengaged by one of the two rises on cam 351 during the next shutter tripping cycle. This return movement of lever 363 is transmitted by link 365 out of engagement with that one of the shoulders on cam 350 which it had engaged at the end of the referred to 180° rotation, so that it again assumes its Figure 5 position. Thus the shutter tripping mechanism is reconditioned or reset for the next operation.

In this connection it should be noted that both shutter tripping and resetting operations are positive and accordingly inadvertent shutter release at any time by reason of vibration, rough handling or other cause, is precluded.

SHUTTER

2: *Shutter speed control*

In order to obtain different shutter speeds for different exposure conditions, we have provided a shutter speed control or retard mechanism which is generally indicated at 373 in Figure 6. This retard device includes a shaft or pivot 374 to which is secured a speed setting cam 375 which is so contoured as to have preferably four dwells 376, 377, 378 and 379, each of which is of constant curvature through a suitable number of degrees, for a purpose to be described.

Freely mounted on shaft 374 is a retard segment 380 and a snubber segment 381 (see Figure 7B) which may be identical in shape, and which coact with a pair of superimposed pallets 382 and 383 freely mounted on a pin 384, the upper end of which is carried in bracket 342, and the lower end of which is carried in the shutter supporting plate 331. These pallets and their respective segments accordingly constitute escapement devices, one of which functions to retard the shutter speed in accordance with the setting of cam 375, and the other of which rapidly decelerates the shutter operating mechanism toward the end of its cycle to prevent a hammer-blow stop. Each of segments 380 and 381 may carry a pin, such as pin 385 (Figure 6) on segment 380. This pin not only fastens a lug 386 to the segment, but also constitutes an anchor for one end of a spring 387, the other end of which is anchored by a pin 388, this spring being coiled around shaft 374 so as to impart a counterclockwise bias to pallet 380, as viewed in Figure 6. The other pallet 381 (Figure 7B) is similarly biased by a spring (not shown).

Each of segments 380 and 381 is provided with a lip or tab, such as tab 389, which lies in the path of a cam 390 which is fastened to a shaft 391, this being the shaft which carries pinion 339 (Figure 5) by which the shutter leaves are driven, as hereinbefore described. Shaft 391 (Figure 6) also carries a snubber cam 392, which is adapted to engage the tab (not shown) on segment 381 (Figure 7B) which underlies tab 389 (Figure 6) on segment 380. It may now be seen that when the shutter is tripped, retard cam 390 whirls counterclockwise, as viewed in Figure 6, until it engages tab 389. Thereupon, rotation of cam 390, and accordingly of the shutter driving mechanism, is retarded through the operation of the escapement comprising segment 380 and pallet 382.

Toward the end of the rotation of shaft 391, snubber pallet 382 engages its tab on segment 381 (Figure 7B) and thus the second escapement device, comprising segment 381 and pallet 383, operates to decelerate rapidly the movement of the shutter operating mechanism at the end of its cycle, thus preventing the several elements from coming to an abrupt and possibly damaging stop.

The degree of travel of segment 380 (Figure 6), of course, determines the duration of engagement between retard cam 390 and tab 389, and accordingly determines the shutter speed, i. e. the period during which the shutter leaves are open. Accordingly, to set the segment 380 in the desired position, there are provided a pair of arms 393 and 394 which are freely mounted on pin 384. Arm 393 includes an ear 395 which is adjustably connected to a complementary ear 396 on arm 394 by an eccentric device 397 so that the angular relationship between the two arms may be adjusted. This is for a purpose to be described. The upper end 393a of arm 393 engages the periphery of setting cam 375, while the upper end 394a of arm 394 engages the end of lug 386. A spring 398, which has one end fastened to arm 394, and the other end fastened to a pin 399 on shutter bracket 342, pulls both of the arms 394 and 395 clockwise, as viewed in Figure 6, to maintain arm end 393a in engagement with the periphery of setting cam 375. It may now be seen that as the shutter cam is rotated to one of its four selective positions, arms 393 and 394 are rocked counterclockwise so that the upper end 394a of arm 394 may, by reason of its engagement with lug 386, pivot segment 380 clockwise, thereby positioning its tab 389 in accordance with the shutter speed selected. Hence, as tab 389 is positioned toward or away from shaft 391, which carries retard cam 390, the shutter speed is adjusted accordingly.

The top of shaft 374 constitutes a coupling adapted to mate with a connector 400 (Figure 7) which is carried in the same part of inner cone 49 (Figure 3) which carries connectors 221 and 315 (Figure 7), as previously described. Connector 400 is, in turn, adapted to mate with a coupling 401 (Figure 4) carried on one end of a shaft 402, rotatably mounted in bracket portion 218 of the downwardly extending portion 52 of the camera base plate 39. The other end of shaft 402 carries a bevel gear 403 which meshes with another bevel 404. secured to a shaft 405 rotatably mounted in bracket portion 218. The outer end of this shaft carries a bevel gear 406 which, as shown in Figure 3, meshes with another bevel gear 407 secured to the bottom of a shaft 408. This shaft is connected through suitable reduction gearing and shafts (not shown) to a control knob 409 (Figure 2) on top of the camera, which may be manually operated to set the shutter speed as desired. The several shafts and gears which connect the knob 409 to shaft 374 (Figure 6) necessarily have a certain amount of play or backlash therein, which renders accurate setting of shutter speed difficult. A precise shutter speed setting, however, is attained by the coaction between the several arcuate dwells on setting cam 375 and arm 393 through the eccentric connection of this arm with arm 394. Thus, the end 393a of arm 393 may, when the mechanism is being adjusted, be positioned midway of one of the dwells. Then, by means of the eccentric connection 397, arm 394 may be pivoted relative to arm 393 until it engages lug 386 and the eccentric connection tightened. It follows then that setting cam 375 does not have to assume an exact position relative to the end of arm 393 when the shutter speed is set, and accordingly any backlash in the connection between the cam and knob 409 (Figure 2) is compensated for.

It may now be seen that we have provided a camera which attains the several objects above set forth in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. In camera construction, in combination, a body, a film magazine detachably mounted in said body, a film supply spool rotatably mounted in said magazine, a movable pressure plate in said magazine operable to force the film into the focal plane of the camera at the time of exposure, driving mechanism supported on said body and having a separable connection with said magazine, spring means in said magazine for forcing said pressure plate into the focal plane, means operated by said driving mechanism for forcing said pressure plate out of the focal plane against the pressure of said spring, and means connected to said spool and to said driving mechanism and operated by the driving mechanism for turning said spool thereby to provide film slack when the pressure plate is forced into the focal plane.

2. In camera construction, in combination, a body, a film magazine detachably mounted in said body, film supply and take-up spools rotatably mounted in said magazine, a movable pressure plate in said magazine operable to force the film into the focal plane of the camera at the time of exposure, driving mechanism supported on said body and having a separable connection with said magazine, spring means in said magazine for forcing said pressure plate into the focal plane, means operated by said driving mechanism for forcing said pressure plate out of the focal plane against the pressure of said spring, and means for directing first one edge and then an opposite edge of the pressure plate into the focal plane as the pressure plate is forced against the action of said spring said first edge being that edge of the pressure plate which underlies said take-up spool.

3. In camera construction, in combination, a body, a film magazine adapted to be detachably mounted in said body, said film magazine including film supply and take-up spools, means for rotating said take-up spool to wind film thereon, means for holding said take-up spool against rotation in the opposite direction, a pressure plate in said magazine adapted to be forced into the camera's focal plane, and means connected with said supply spool for rotating said spool during the lowering of the pressure plate to the focal plane to unwind film from the supply spool and for reversely rotating said spool during the raising of the pressure plate from the focal plane to rewind on said spool the film unwound therefrom during the lowering of the pressure plate.

4. In camera construction, in combination, a body, a film magazine adapted to be detachably mounted in said body, means for locking said magazine in said body, film supply and take-up spools rotatably mounted in said body, a pressure plate in said magazine, means for moving said plate into the camera's focal plane, means forming a connection between said locking means and said pressure plate for moving said pressure plate out of the focal plane upon unlocking operation of said locking means, and means connected to and operated by said locking means during locking movement thereof for driving said supply spool to unwind film therefrom as the pressure plate is moved to its focal plane position.

5. In camera construction, in combination, a body, a film magazine adapted to be detachably mounted in said body, means forming a light slide receiving groove in said body, a light slide adapted to be inserted in said groove to exclude illumination from the interior of said magazine, and means for engaging the film and operated by said light slide upon insertion thereof in said groove for moving the film out of the path of the light slide as it is inserted into the magazine, said means including a plurality of fingers pivotally secured to said magazine adjacent said groove, said fingers when engaged by said slide being adapted to swing under the edge of the film and raise the film out of the path of movement of the slide as the slide is inserted into the magazine.

6. In camera construction, in combination, a body, a magazine adapted to be detachably secured in said body, means movable between locking and unlocking positions for locking said magazine in said body, a light slide adapted to be detachably inserted in said magazine to preclude entrance of illumination into the magazine, and cooperating means on said locking means and said light slide for precluding locking operation of said locking means when said light slide is in said camera.

7. In camera construction, in combination, a body carrying a shutter, a camera magazine adapted to be detachably mounted in said body, means on said body and connectable to said magazine upon installation of the magazine in the body for operating said magazine, camera shutter tripping means on said body, and interlock means associated with said operating means and said tripping means for locking said tripping means against operation when the magazine is improperly installed in said body.

8. In camera construction, in combination, a body, a film magazine mounted in said body, a film supply spool rotatably mounted in said magazine, a movable pressure plate in said magazine operable to force the film into the focal plane of the camera at the time of exposure, a cross beam extending transversely of said magazine and overlying said pressure plate, a spring disposed between said cross beam and said pressure plate for urging said pressure plate away from said beam toward the focal plane of the camera, driving mechanism supported on said body and having a driving connection with said magazine, means for forcing said pressure plate away from the focal plane against the pressure of said spring, and means other than said pressure plate connected to said spool and to said driving mechanism and operated by the driving mechanism for turning said spool thereby to provide film slack when the pressure plate is forced into the focal plane.

9. Apparatus according to claim 8 wherein the means for providing film slack includes a driving connection between the driving mechanism and the film supply spool as the pressure plate is lowered into the focal plane to provide slack film, said driving connection comprising a plurality of pivotally connected levers, one of which is attached to a coupling on the magazine which mates with the separable connection of the driving mechanism, and another of which is operatively attached to the film supply spool.

10. In camera construction, in combination, a body, a film magazine mounted in said body, a movable pressure plate in said magazine operable to force film from spools disposed at opposite ends of the plate into the focal plane of the camera, driving mechanism supported on said body and operatively connected with said magazine, means in said magazine for forcing said pressure plate into the focal plane, means operated by said driving mechanism for forcing said pressure plate out of the focal plane, and means connected to said driving mechanism and to said plate and driven by the former for directing first one transverse edge and then the opposite transverse edge of the pressure plate into the focal plane.

11. In camera construction, in combination, a body, a film magazine mounted in said body, a movable pressure plate in said magazine operable to force the film into the focal plane of the camera, driving mechanism supported on said body and operatively connected with said magazine, means in said magazine for forcing said pressure plate into the focal plane, means operated by said driving mechanism for forcing said pressure plate out of the focal plane, and means for directing first one transverse edge and then the opposite transverse edge of the pressure plate into the focal plane, said last-mentioned means including a spring biased lever, one end of which bears against the pressure plate adjacent said first-mentioned transverse edge.

12. In camera construction, in combination, a body, a film magazine mounted in said body, a movable pressure plate in said magazine operable to force the film into the focal plane of the camera, driving mechanism supported on said body and operatively connected with said magazine, means in said magazine for forcing said pressure plate into the focal plane, means operated by said driving mechanism for forcing said pressure plate out of the focal plane, means for directing first one transverse edge and then the opposite transverse edge of the pressure plate into the focal plane, said last-mentioned means including a spring biased lever, one end of which bears against the pressure plate adjacent said first-mentioned transverse edge, and means responsive to the bias of said first-mentioned spring for forcing the second-mentioned transverse edge of the pressure plate into the focal plane.

13. In camera construction, in combination, a body, a film magazine mounted in said body, a movable pressure plate in said magazine operable to force the film into the focal plane of the camera, driving mechanism supported on said body and operatively connected with said magazine, means in said magazine for forcing said pressure plate into the focal plane, means operated by said driving mechanism for forcing said pressure plate out of the focal plane, means for directing first one transverse edge and then the opposite transverse edge of the pressure plate into the focal plane, said last-mentioned means including a spring biased lever, one end of which bears against the pressure plate adjacent said first-mentioned transverse edge, and cam and lever means responsive to the bias of said first-mentioned spring for forcing the second-mentioned transverse edge of the pressure plate into the focal plane.

14. In camera construction, in combination, a body, a film magazine mounted in said body, said film magazine including film supply and take-up spools, means for rotating said take-up spool to wind film thereon, a friction brake associated with said supply spool to stop said spool upon cessation of rotation of said take-up spool, means for holding said take-up spool against rotation in the opposite direction, a pressure plate in said magazine adapted to be forced into the camera's focal plane, and means other than said pressure plate connected with said supply spool for rotating said spool while said take-up spool is motionless and during the movement of the pressure plate toward the focal plane to unwind film from the supply spool, thereby to create slack to accommodate the movement of the pressure plate.

15. In camera construction, in combination, a body, a film magazine adapted to be detachably mounted in said body, means for locking said magazine in said body, a pressure plate in said body, spring means for moving said plate into the camera's focal plane, means forming a connection between said locking means and said pressure plate for moving said pressure plate out of the focal plane upon unlocking operation of said locking means, means forming a light slide receiving groove in said magazine, a light slide adapted to be inserted in said groove to seal the interior of the magazine from light, and means for engaging the film and operated by said light slide upon insertion thereof in said groove for moving the film out of the path of the light slide as it is inserted into the magazine, the path of movement of said light slide into the magazine being unobstructed when the pressure plate is raised.

16. In camera construction, in combination, a body including means forming a focal plane, a film magazine adapted to be detachably mounted in said body, means for locking said magazine in said body, means forming a light slide receiving groove in said magazine spaced from said focal plane, the entrance end of said groove being exposed when said magazine is mounted in said body, a pressure plate in said magazine, means for moving a side of said plate past said groove into said focal plane, means forming a connection between said locking means and said pressure plate for moving said pressure plate out of said focal plane upon unlocking operation of said locking means and away from said groove to leave said groove unobstructed, and a light slide adapted to be inserted in said groove when said magazine is unlocked.

17. In camera construction, in combination, a body, a magazine adapted to be detachably secured in said body, means movable between locking and unlocking positions for locking said magazine in said body, a light slide adapted to be detachably inserted in said magazine to preclude entrance of illumination into the magazine, and cooperating means on said locking means and said light slide for precluding locking operation of said locking means when said light slide is in said camera, said cooperating means including handles on said locking means and on said light slide, the handle on said locking means being of such length as to engage said light slide handle upon movement toward locking position.

18. In camera construction, in combination, a body, a film magazine adapted to be detachably mounted on said body, means for locking said magazine on said body, a pressure plate in said magazine, film spools rotatably mounted in said magazine at opposite ends respectively of said pressure plate, means for moving said pressure plate and accordingly film lying thereunder into the camera's focal plane, means forming a connection between said locking means and said pressure plate for moving said presure plate into the focal plane upon locking operation of said locking means and out of the focal plane upon unlocking operation of said locking means, and means responsive to locking operation of said locking means for rotating one of said spools to create sufficient film slack to accommodate the lowering movement of said pressure plate, said last-mentioned means also operating in response to unlocking operation of said locking means to rewind the slack film on said spool as the pressure plate is raised.

19. Apparatus according to claim 18, wherein the film unwinding and rewinding means includes a mechanical connection between the locking means and film supply spool.

20. In a camera having a shutter and tripping mechanism therefor, that improvement which includes, a magazine, means for detachably mounting said magaine on said camera, means for locking said magazine on said camera, and interlock means responsive to unlocking operation of said locking means for locking said shutter tripping mechanism.

21. In a camera having a shutter and tripping mechanism therefor, that improvement which includes, a film magazine, means for detachably mounting said magazine on said camera, means for locking said magazine on said camera, means forming a light slide receiving groove in said magazine, a light slide adapted to be inserted in said groove to seal the interior of the magazine from light, said locking means being out of the path of movement of said slide into the magazine when in its unlocked position and being in the path of movement of said slide when in its locked position thereby to preclude insertion of said slide when the magazine is locked on the camera, and interlock means responsive to unlocking operation of said locking means to lock said tripping mechanism against operation whereby said shutter cannot be tripped when said light slide is in the magazine.

GEORGE RATTRAY.
IRVING W. DOYLE.

REFERENCES CITED

The following references are of record in the file of this patent:

UNITED STATES PATENTS

| Number | Name | Date |
| --- | --- | --- |
| 370,370 | Blair | Sept. 27, 1887 |
| 890,936 | Sandell | June 16, 1908 |
| 1,152,599 | Carleton et al. | Sept. 7, 1915 |
| 1,199,238 | Brauburger | Sept. 26, 1916 |
| 1,612,860 | Fairchild | Jan. 4, 1927 |
| 1,744,773 | Labrely | Jan. 28, 1930 |
| 1,764,066 | Chamberlin | June 17, 1930 |
| 1,804,680 | Fairchild | May 12, 1931 |
| 1,835,457 | Briechle | Dec. 8, 1931 |

(Other references on following page)

UNITED STATES PATENTS

| Number | Name | Date |
|---|---|---|
| 1,863,573 | Lutz et al. | June 2, 1932 |
| 1,957,889 | Hopkins et al. | May 8, 1934 |
| 1,974,842 | Black | Sept. 25, 1934 |
| 2,047,070 | Horner | July 7, 1936 |
| 2,049,041 | Berggren | July 28, 1936 |
| 2,131,926 | Weiblen et al. | Oct. 4, 1938 |
| 2,186,612 | Mihalyi | Jan. 9, 1940 |
| 2,194,031 | Riszdorfer | Mar. 19, 1940 |
| 2,283,788 | Briechle et al. | May 19, 1942 |
| 2,293,195 | Cohen | Aug. 18, 1942 |
| 2,307,646 | Sonne | Jan. 5, 1943 |
| 2,319,530 | Bolsey | May 18, 1943 |
| 2,343,206 | Rath | Feb. 29, 1944 |

FOREIGN PATENTS

| Number | Country | Date |
|---|---|---|
| 348,933 | Germany | Feb. 21, 1922 |
| 633,845 | Germany | Aug. 8, 1936 |